US011494321B1

(12) United States Patent
Yu et al.

(10) Patent No.: US 11,494,321 B1
(45) Date of Patent: Nov. 8, 2022

(54) STATE BUFFER MEMLOC RESHAPING

(71) Applicant: Amazon Technologies, Inc., Seattle, WA (US)

(72) Inventors: Yunxuan Yu, Los Angeles, CA (US); Hongbin Zheng, San Jose, CA (US); Qingrui Liu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/449,586

(22) Filed: Sep. 30, 2021

(51) Int. Cl.

| | |
|---|---|
| ***G06F 13/28*** | (2006.01) |
| ***G06F 13/16*** | (2006.01) |
| ***G06F 9/50*** | (2006.01) |
| ***G06F 9/30*** | (2018.01) |

(52) U.S. Cl.
CPC ...... *G06F 13/1673* (2013.01); *G06F 9/30043* (2013.01); *G06F 9/5016* (2013.01); *G06F 13/1621* (2013.01); *G06F 13/28* (2013.01)

(58) Field of Classification Search
CPC .................................................. G06F 13/1673
USPC ........................................................ 711/154
See application file for complete search history.

(56) References Cited

U.S. PATENT DOCUMENTS

| | | | | |
|---|---|---|---|---|
| 6,745,173 | B1 * | 6/2004 | Amundsen | G06F 16/24545 |
| 9,710,265 | B1 * | 7/2017 | Temam | G06N 3/063 |
| 9,779,786 | B1 * | 10/2017 | Wu | G06K 9/6273 |
| 2007/0283016 | A1 * | 12/2007 | Pendarakis | H04L 12/66 709/226 |
| 2008/0222646 | A1 * | 9/2008 | Sigal | G06F 9/505 718/105 |
| 2012/0166374 | A1 * | 6/2012 | Moussa | G06N 3/084 706/30 |
| 2014/0067735 | A1 * | 3/2014 | Yu | G06N 3/02 706/20 |
| 2017/0200094 | A1 * | 7/2017 | Bruestle | G06F 5/01 |
| 2017/0372202 | A1 * | 12/2017 | Ginsburg | G06N 3/0454 |
| 2022/0129759 | A1 * | 4/2022 | Yao | G06N 3/084 |
| 2022/0138553 | A1 * | 5/2022 | Mills | G06N 3/08 706/16 |
| 2022/0156575 | A1 * | 5/2022 | Mills | G06N 3/08 |

* cited by examiner

*Primary Examiner* — Titus Wong
(74) *Attorney, Agent, or Firm* — Weaver Austin Villeneuve & Sampson LLP

(57) ABSTRACT

A computer-implemented method includes identifying, from instruction code for executing by a computing system to implement a neural network, a first instruction for allocating a first region of a local memory of an accelerator of the computing system to a tensor, and a first direct memory access (DMA) load instruction for loading the tensor from a location of a system memory of the computing system to a second region of the local memory; adding a first tensor copy instruction in the instruction code to save the tensor in the first region of the local memory to a third region of the local memory that has dimensions different from dimensions of the first region; and replacing the first DMA load instruction with a second tensor copy instruction for saving data in the third region of the local memory to the second region of the local memory.

20 Claims, 13 Drawing Sheets

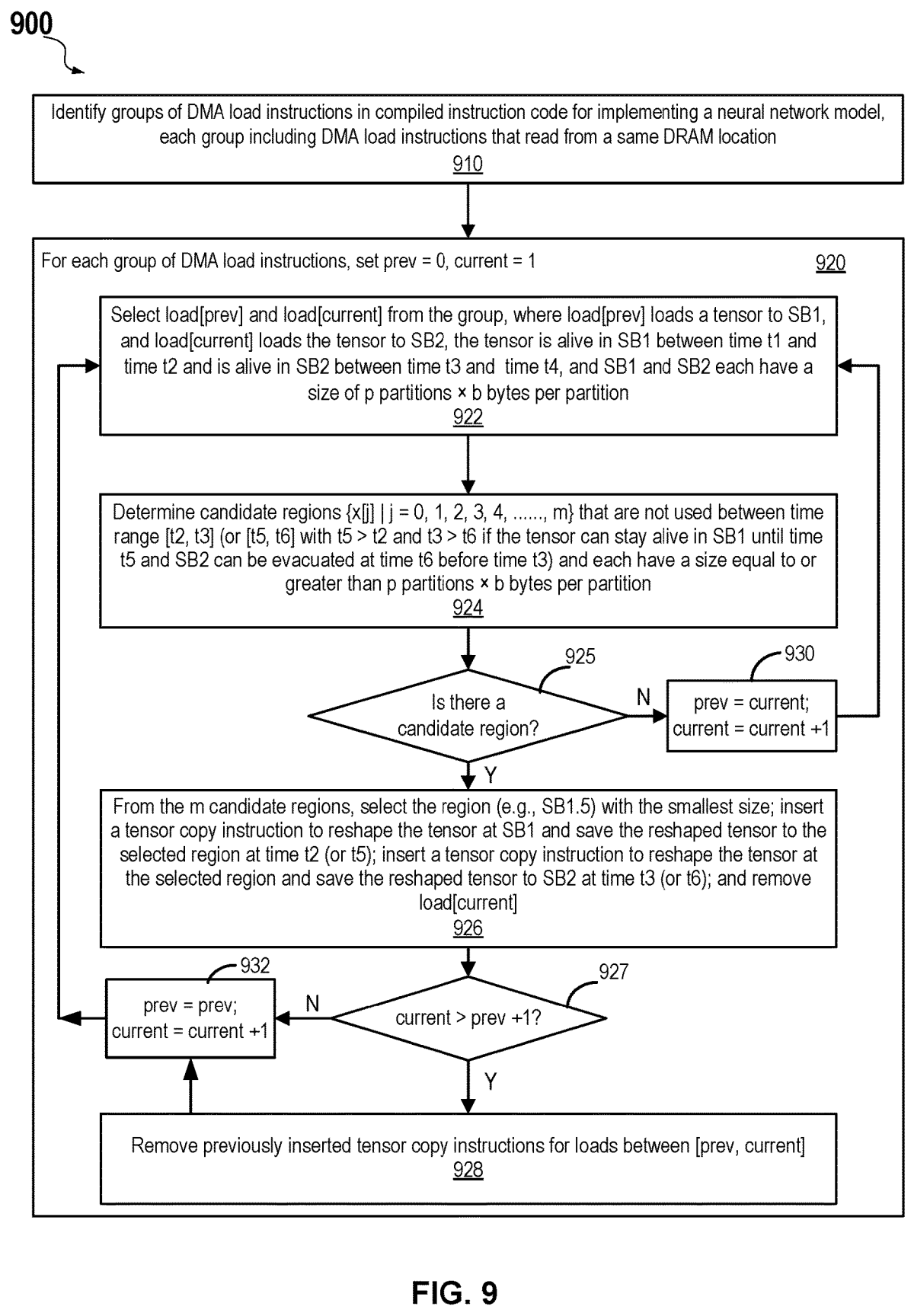

900

Identify groups of DMA load instructions in compiled instruction code for implementing a neural network model, each group including DMA load instructions that read from a same DRAM location
910

For each group of DMA load instructions, set prev = 0, current = 1
920

Select load[prev] and load[current] from the group, where load[prev] loads a tensor to SB1, and load[current] loads the tensor to SB2, the tensor is alive in SB1 between time t1 and time t2 and is alive in SB2 between time t3 and time t4, and SB1 and SB2 each have a size of p partitions × b bytes per partition
922

Determine candidate regions {x[j] | j = 0, 1, 2, 3, 4, ......, m} that are not used between time range [t2, t3] (or [t5, t6] with t5 > t2 and t3 > t6 if the tensor can stay alive in SB1 until time t5 and SB2 can be evacuated at time t6 before time t3) and each have a size equal to or greater than p partitions × b bytes per partition
924

925
Is there a candidate region?

N 930
prev = current;
current = current +1

Y

From the m candidate regions, select the region (e.g., SB1.5) with the smallest size; insert a tensor copy instruction to reshape the tensor at SB1 and save the reshaped tensor to the selected region at time t2 (or t5); insert a tensor copy instruction to reshape the tensor at the selected region and save the reshaped tensor to SB2 at time t3 (or t6); and remove load[current]
926

927
current > prev +1?

N 932
prev = prev;
current = current +1

Y

Remove previously inserted tensor copy instructions for loads between [prev, current]
928

FIG. 9

STATE BUFFER MEMLOC RESHAPING

BACKGROUND

Artificial neural networks are computing systems with architectures based on biological neural networks. Artificial neural networks can be trained to perform certain tasks, such as natural language processing, identifying or classifying physical objects, activities, and characters, and the like. An artificial neural network may include multiple layers of processing nodes. Processing nodes on one neural network layer may perform computations on input data generated by processing nodes on the preceding layer to generate output data. In many neural network models, the size of the data used by the neural network model, including the input data, weights to be applied to the input data, and intermediate output data from preceding layers, can be too large to fit in the local memory of a processing unit, such as a graphics processing unit (GPU), a tensor processing unit (TPU), or a neural network processor. As such, the input data, weights, and/or output data may need to be transferred between the local memory and a large-capacity memory device outside of the processing unit, such as a dynamic random access memory (DRAM) device in the system memory.

BRIEF DESCRIPTION OF THE DRAWINGS

Various embodiments in accordance with the present disclosure will be described with reference to the drawings, in which:

FIG. 9 illustrates an example of a method of using tensor copy instructions to reduce DMA operations for state buffer spilling and reloading according to certain embodiments;

DETAILED DESCRIPTION

Figure 1:
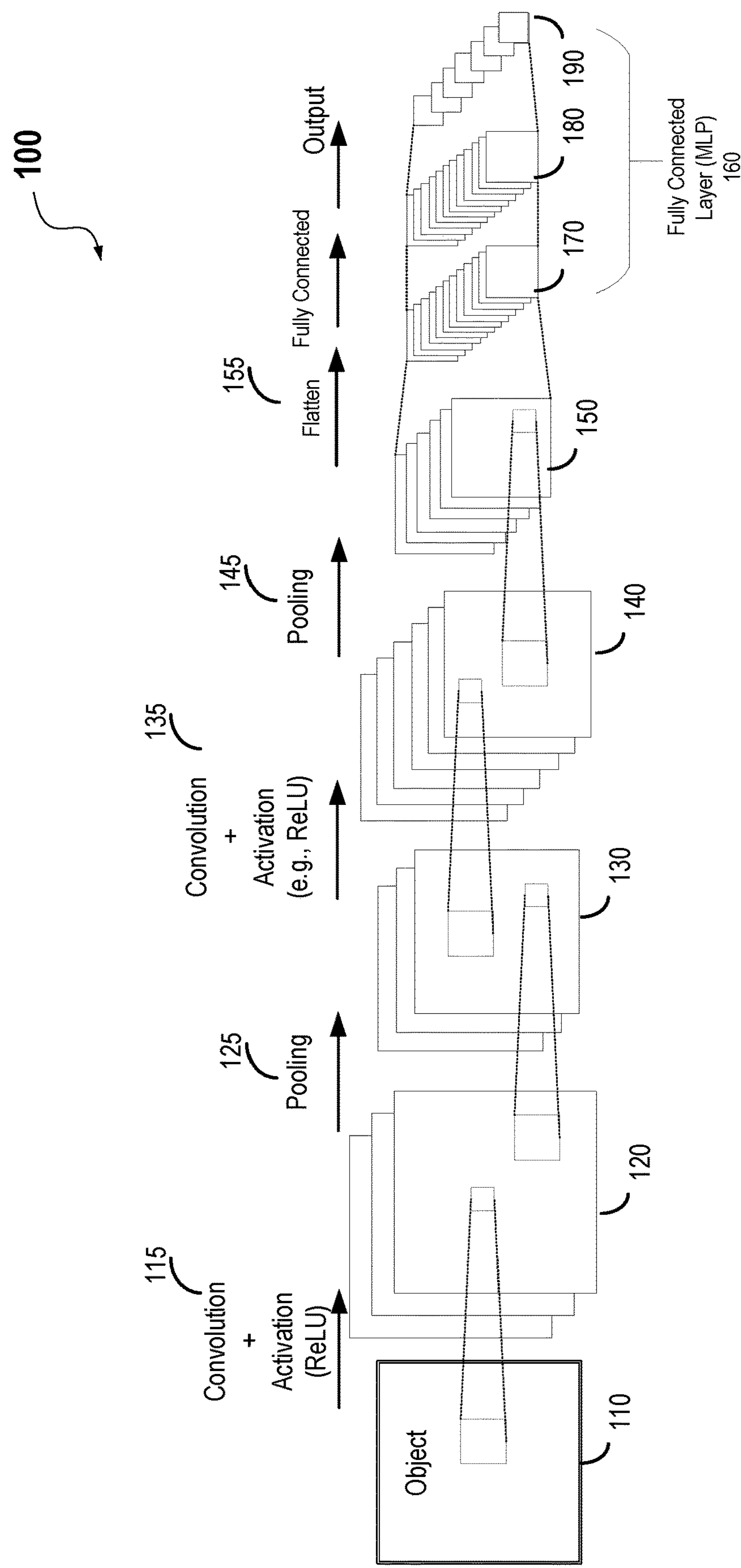
FIG. 1 illustrates an example of a convolutional neural network (CNN)

Techniques disclosed herein relate generally to neural network model compilers. More specifically, disclosed herein are techniques for reducing DMA operations in instruction code for implementing a neural network model, thereby improving the overall performance of a computing system for implementing the neural network model. Various inventive embodiments are described herein, including devices, systems, circuits, methods, processes, non-transitory computer-readable media, and the like.

An artificial neural network may generally include multiple processing nodes arranged on two or more layers. Processing nodes on a neural network layer may receive a stream of input data elements, multiply the input data elements with corresponding weights to compute weighted sums of the input data elements, and forward the weighted sums to the next layer. The size of the data used in each layer, such as the dimensions of input data for each channel, the number of channels, the number of weights (e.g., filters) to be applied to the input data, the dimensions of each filter, and the like, can be very large. For example, a convolutional neural network may include thousands or more of processing nodes and millions or more of weights and input data elements. Therefore, neural network models developed to perform complex tasks may generally have high demand on computational power and local memory space. For example, some applications (e.g., natural language processing and autonomous navigation) may need almost instantaneous inference results with minimal latency and high throughput, and some applications may have large feature maps and/or weight matrices for large tensor operations (e.g., matrix multiplications for convolution operations).

The underlying hardware for implementing a neural network, such as a computing system including a graphic processing unit (GPU), a tensor processing unit (TPU), a processing element array, or other processing units, may generally have a certain number of processing elements (e.g., in a pre-configured two-dimensional array), and a local memory having a finite size and a maximum data read/write bandwidth. For example, the local memory (also referred to as a state buffer in this disclosure) of a neural network processor may include a few megabytes. A neural network processor may include, for example, equal to or less than about 128×128 processing elements. Therefore, the neural network processor may not have sufficient local memory to simultaneously store the weights and feature maps used in the computation and may not have sufficient processing elements to perform large tensor operations. As such, some data (e.g., intermediate output results) in the state buffer may need to be temporarily saved to the system memory to make room for other data, and may need to be reloaded into the state buffer when the data needs to be used. This process may be referred to as spilling and reloading. Furthermore, data transfer between the local memory of the neural network processor and the system memory (e.g., a dynamic random access memory (DRAM) on another chip or another circuit board) may have a finite bandwidth shared by multiple devices, and thus it may take a long time to load a large tensor from the system memory to the local memory or save a large tensor from the local memory to the system memory.

As such, many neural network models may be executed by neural network processors in a piecemeal fashion in which a large tensor operation may be converted into many small tensor operations using small tensors, such as a subset of weights and/or a subset (e.g., a tile) of a feature map. Tensors used by the neural network processor (including static variables such as filters or weights) and tensors generated by the neural network processor (e.g., intermediate output results) may need to be appropriately allocated to and removed from the local memory during the execution of the neural network model, such that tensors used for a computation operation by the neural network processor may be available at the relatively small local memory with a minimum delay when needed, in order to fully utilize resources (e.g., the computing power) of the neural network processor to achieve a high performance (e.g., a high throughput and/or a short inference time). Converting a large tensor operation into many smaller tensor operations can also reduce constraints on resource allocation (e.g., local memory allocation), and reduce the latency of loading tensors used by the small tensor operations and/or the latency of saving smaller tensors (e.g., for memory spilling).

The memory allocation, tensorization (converting a large tensor operation into multiple smaller tensor operations), and data transfer may be determined by a compiler that generates and schedules instructions to be executed by the neural network processor and other execution engines of a computing system to implement a neural network model. The instructions may generally include instructions for memory load operations that load input data (e.g., input feature maps) and static variables (e.g., weight matrices or filter tensors) into the local memory, instructions for computation operations that use the input data and the static variables to perform arithmetic operations, and memory save operations that save outputs (e.g., intermediate results) of the computation operations to the system memory to make room for other data used in other operations.

Data transfers between the local memory of a neural network processor and the system memory, including loading input tensors from the system memory to the local memory and saving output tensors from the local memory to the system memory, may be performed using a direct memory access (DMA) controller, in order to limit the involvement of the host processor. The DMA controller may include an interface that may have limited bandwidth (e.g., about 128 or 256 Bytes per cycle) and may be shared by multiple processing engines in the computing system. A DMA controller may use memory descriptors to perform the data transfers to or from a DRAM. Retrieving the memory descriptors, initializing the DRAM access, and regularly refreshing the DRAM may incur additional overhead for the DMA transfers. Thus, DMA accesses may have a long latency and a low bandwidth/throughput.

In many applications, the sizes of input tensors used by a neural network model and/or output tensors generated by the neural network model can be hundreds of times greater than the capacity of the local memory. Therefore, hundreds of DMA accesses may be used to transfer the data. Due to the long latency and/or low bandwidth of each DMA access, accessing the system memory hundreds of times to transfer small tensors using DMA can cause prolonged latencies and hinder practical applications of the neural network model.

According to certain embodiments, to reduce the overhead of performing a large number of DMA transfers, a compiler may, after the resource allocation and instruction generation of a typical compiling process, analyze the local memory allocation and usage by the instructions and modify the instructions by, for example, replacing some DMA operations with tensor copy instructions that copy tensors within the local memory without involving the DMA controller. For example, at least some DMA operations for state buffer spilling and reloading may be replaced by tensor copy instructions that can reshape the dimensions (e.g., changing the number of partitions and the number of elements per partition but not the total number of elements) of the tensors to be spilled, and save the reshaped tensors in unused regions of the state buffer that may not have dimensions suitable for storing the original tensors. When the original tensor of a reshaped tensor needs to be used in subsequent instructions, a second tensor copy instruction may be used to change the reshaped tensor in the state buffer back to its original shape and save the tensor to the state buffer for use by the subsequent instructions. In some embodiments, the subsequent instructions may use the tensor with dimensions different from the dimensions of the original tensor and the reshaped tensor, and thus the second tensor copy instruction may read the reshaped tensor, reshape it into the desired dimensions, and save the tensor with the desired dimensions to the state buffer for use by the subsequent instruction. In this way, some DMA save instructions and DMA load instructions may be replaced by tensor copy instructions.

The tensor copy instructions may be performed by a processing engine (e.g., a pooling engine of a neural network processor) that may be on the same chip as the local memory and may be connected to the local memory through a dedicated bus capable of parallel data transfer. Therefore, there may not be bandwidth competition for the tensor copy instructions. There is no initialization or refreshing for the tensor copy instructions either. As such, the tensor copy instructions can be performed at a high speed and with a low latency and a short execution time. As a result, the neural network implemented by the computing system using the compiled instructions may have a faster processing speed, a lower latency, and a high throughput.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Artificial neural networks (also referred to as "neural networks") have been used in machine learning research and industrial applications and have achieved many breakthrough results in, for example, image recognition, speech recognition, computer vision, natural language processing, and the like. An artificial neural network may include multiple processing nodes arranged on two or more layers, where processing nodes on one layer may connect to processing nodes on another layer. The processing nodes can be divided into layers including, for example, an input layer, a number of intermediate layers (also known as hidden layers), and an output layer. Each processing node on a layer (e.g., an input layer, an intermediate layer, etc.) may receive a sequential stream of input data elements, multiply each input data element with a weight, compute a weighted sum of the input data elements, and forward the weighted sum to the next layer. An artificial neural network, such as a convolutional neural network (ConvNet or CNN), may include thousands or more of processing nodes and millions or more of weights and input data elements.

A convolutional neural network may perform operations including, for example, (1) convolution; (2) non-linearity (or activation) function (e.g., ReLU); (3) pooling or sub-sampling; and (4) classification. Different CNNs may have different combinations of these four main operations, as well as other additional operations. For example, a ResNet-50 network may include network layers that include mostly convolution layers and a few pooling layers, and may also perform residue-add operations for residue learning.

FIG. 1 illustrates an example of a convolutional neural network (CNN) 100 for image or other object classifications. CNN 100 may perform four types of operations including convolution, non-linearity (or activation) function (e.g., ReLU), pooling or sub-sampling, and classification (fully-connected layer). An object 110 to be classified, such as one or more input images or other input datasets (referred to as input feature maps), may be represented by a matrix of pixel values. For example, object 110 may include multiple channels (e.g., multiple input feature maps), each channel representing a certain component of object 110. For example, an image from a digital camera may have at least a red channel, a green channel, and a blue channel, where each channel may be represented by a 2-D matrix of pixels having pixel values in the range of, for example, 0 to 255 (i.e., 8-bit). A gray-scale image may have only one channel. In the following description, the processing of a single image channel using CNN 100 is described. Other channels may be processed similarly.

As shown in FIG. 1, object 110 (e.g., input images) may first be processed by a first convolution layer 115 using a first set of filters, where first convolution layer 115 may perform a convolution between a matrix representing the input image and a matrix representing each filter in the first set of filters. The convolution may include multiple matrix multiplication. First convolution layer 115 may also perform a non-linear activation function (e.g., ReLU). An output matrix 120 from first convolution layer 115 may have smaller dimensions than the input image. First convolution layer 115 may perform convolutions on the input image using the first set of filters to generate multiple output matrices 120, which may be referred to as output feature maps of first convolution layer 115. The number of filters used may be referred to as the depth of the convolution layer. In the example shown in FIG. 1, first convolution layer 115 may have a depth of three. Each output matrix 120 (e.g., an output feature map) may be passed to a pooling layer 125, where each output matrix 120 may be subsampled or down-sampled to generate a matrix 130.

Each matrix 130 may be processed by a second convolution layer 135 using a second set of filters. A non-linear activation function (e.g., ReLU) may also be performed by the second convolution layer 135 as described above. An output matrix 140 (e.g., an output feature map) from second convolution layer 135 may have smaller dimensions than matrix 130. Second convolution layer 135 may perform convolutions on matrix 130 using the second set of filters to generate multiple output matrices 140. In the example shown in FIG. 1, second convolution layer 135 may have a depth of six. Each output matrix 140 may be passed to a pooling layer 145, where each output matrix 140 may be subsampled or down-sampled to generate an output matrix 150.

The output matrices 150 from pooling layer 145 may be flattened to vectors by a flatten layer 155, and passed through a fully-connected layer 160 (e.g., a multi-layer perceptron (MLP)). Fully-connected layer 160 may include an input layer 170 that takes the 1-D output vector from flatten layer 155. Fully-connected layer 160 may also include a hidden layer and an output layer 190. Fully-connected layer 160 may classify the object in the input image into one of several categories using feature maps or output matrix 150 and, for example, a Softmax function. The operation of the fully-connected layer may be represented by matrix multiplications. For example, if there are M nodes on input layer 170 and N nodes on hidden layer 180, and the weights of the connections between the M nodes on input layer 170 and the N nodes on hidden layer 180 can be represented by a matrix W that includes M×N elements, the output Y of hidden layer 180 may be determined by Y=X×w.

The convolution operations in a CNN may be used to extract features from the input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to generate a final value that represents a single element of an output matrix (e.g., a feature map). A filter may act to detect certain features from the original input image.

The convolution using one filter (or one filter set) over an input pixel array may be used to produce one feature map, and the convolution using another filter (or another filter set) over the same input pixel array may generate a different feature map. In practice, a CNN may learn the weights of the filters on its own during the training process based on some user specified parameters (which may be referred to as hyperparameters), such as the number of filters, the filter size, the architecture of the network, etc. The higher number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters (or sets of filters) used for the convolution operation. For example, in CNN 100 shown in FIG. 1, three distinct filters are used in first convolution layer 115 to perform convolution operations on the input image, thus producing three different output matrices 120 (or feature maps). Stride is the number of pixels by which the filter matrix is slid over the input pixel array. For example, when the stride is one, the filter matrix is moved by one pixel at a time. When the stride is two, the filter matrix is moved by two pixels at a time. Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 1, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions described above, such as tan h or sigmoid function, can also be used, but ReLU has been found to perform better in many situations.

Spatial pooling (also referred to as subsampling or down-sampling) may reduce the dimensions of each feature map, while retaining the most important information. In particular, pooling may make the feature dimensions smaller and more manageable, and reduce the number of parameters and computations in the network. Spatial pooling may be performed in different ways, such as max pooling, average pooling, sum pooling, etc. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

In the example shown in FIG. 1, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a convolutional neural network, such as CNN 100, may be similar to the training process for any feedforward neural network. First, all parameters and weights (including the weights in the filters and weights for the fully-connected layer) may be initialized with random values (or the parameters of a known neural network). Second, the convolutional neural network may take a training sample (e.g., a training image) as input, perform the forward propagation steps (including convolution, non-linear activation, and pooling operations, along with the forward propagation operations in the fully-connected layer), and determine the output probability for each possible class. Since the parameters of the convolutional neural network, such as the weights, are randomly assigned for the training example, the output probabilities may also be random.

At the end of the training process, all weights and parameters of the CNN may have been optimized to correctly classify the training samples from the training dataset. When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

Figure 2:
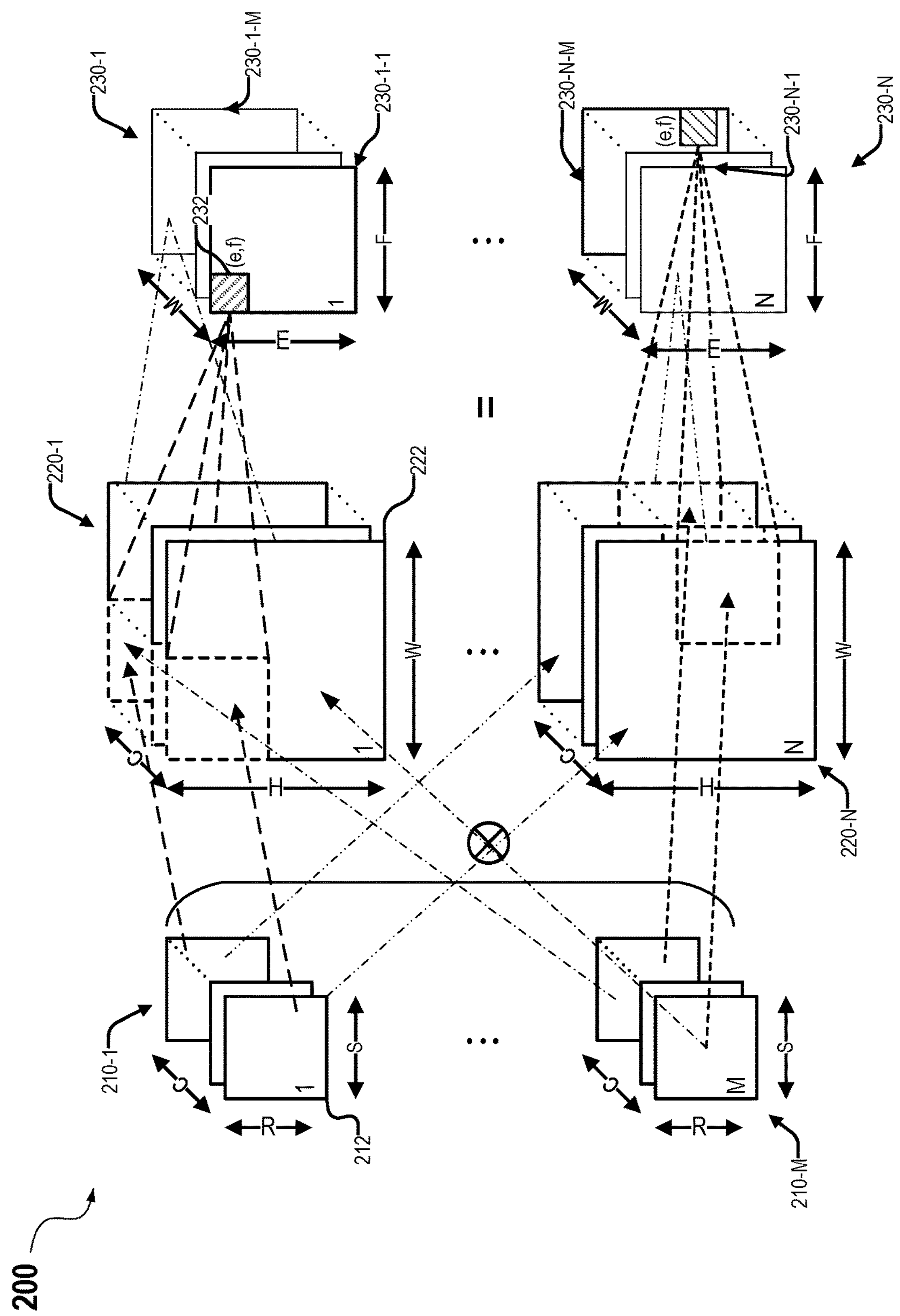
FIG. 2 illustrates an example of a model for a convolution layer of a convolutional neural network.

FIG. 2 illustrates an example of a model 200 for a convolution layer of a convolutional neural network used in, for example, image processing. As illustrated in the example, there may be multiple (e.g., N) 3-D inputs 220-1, . . . , and 220-N to the convolution layer. Each 3-D input may include C channels of 2-D input feature maps (with dimensions H×W). For the first convolution layer in a CNN, such as a ResNet-50, a 3-D input may include, for example, three channels of 2-D images, such as the red, green, and blue color channels. Multiple (e.g., M) 3-D filters 210-1, . . . , and 210-M, each having C 2-D filters of dimensions R×S, may be convolved with the N 3-D inputs 220-1, . . . , and 220-N (e.g., N batches of C input feature maps of dimensions H×W) to generate multiple (e.g., N) 3-D outputs 230-1, . . . , and 230-N, where each of the 3-D outputs 230-1, . . . , and 230-N may include M output feature maps (also referred to as output channels). Each 3-D filter 210-1, . . . , or 210-M (with dimensions C×R×S) may be applied to a 3-D input 220-1, . . . , or 220-N (with dimensions C×H×W) to generate an output feature map (with dimensions E×F as described above with respect to FIGS. 3A and 3B) in a 3-D output 230-1, . . . , or 230-N that includes M output feature maps, and thus M 3-D filters may be used to generate the M output feature maps in a 3-D output 230-1, . . . , or 230-N for a 3-D input 220-1, . . . , or 220-N. For example, 3-D filter 210-1 may be applied to 3-D input 220-1 to generate an output feature map 230-1-1, . . . and 3-D filter 210-M may be applied to 3-D input 220-1 to generate an output feature map 230-1-M. The same M 3-D filters 210-1, . . . , and 210-M can be applied to each 3-D input 220-1, . . . , or 220-N to generate each respective 3-D output 230-1, . . . , or 230-N that includes M output feature maps. For example, 3-D filter 210-1 may be applied to 3-D input 220-N to generate an output feature map 230-N-1, and 3-D filter 210-M may be applied to 3-D input 220-N to generate an output feature map 230-N-M. Thus, there are N 3-D inputs and N 3-D outputs, where each 3-D output includes M output feature maps.

More specifically, as shown in FIG. 2, for a 3-D input 220-1, . . . , or 220-N and a 3-D filter 210-1, . . . , or 210-M, the C 2-D filters (each with dimensions R×S) in a 3-D filter 210-*m* may correspond to the C channels of 2-D input feature maps (each with dimensions H×W) in the 3-D input, and the convolution operation between each 2-D filter of the C 2-D filters and the corresponding channel of the C channels of 2-D input feature maps may be performed. The convolution results for C pairs of 2-D filter and corresponding 2-D input feature map can be summed to generate a convolution output (e.g., a pixel) $O_{e,f}^m$ on an output feature map of index m in the M output feature maps in a 3-D output 230-1, . . . , or 230-N as follows:

$$O_{e,f}^{m} = \sum_{r=0}^{R-1} \sum_{s=0}^{S-1} \sum_{c=0}^{C-1} X_{eD+r,fD+s}^{c} \times W_{r,s}^{c,m}, \tag{1}$$

where m corresponds to the index of the output feature map and the index of the 3-D filter in the M 3-D filters. $X^c_{eD+r,fD+s}$ is the value of a pixel with a horizontal pixel coordinate of eD+r and a vertical pixel coordinate of fD+s in an input feature map of index C in the C channels of 2-D input feature maps in a 3-D input. D is the sliding-window stride distance. e and f are the coordinates of the output pixel in the corresponding output feature map of the M output feature maps and may correspond to a particular sliding window. r and s correspond to a particular location (e.g., pixel or element) within a sliding window or a 2-D filter. $W^{c,m}_{r,s}$ is a weight corresponding to a pixel at a location (r, s) of a 2-D filter of index C in the 3-D filter of index m. Equation (1) indicates that, to compute each convolution output (e.g., pixel) $O_{e,f}^m$ at a location (e, f) on an output feature map m, each pixel $X^c_{eD+r,fD+s}$ within a sliding window in an input feature map of index C may be multiplied with a corresponding weight $W^{c,m}_{r,s}$ to generate a product, the partial sum of the products for the pixels within each sliding window in the input feature map of index C can be computed, and then a sum of the partial sums for all C input feature maps can be computed to determine the value of the pixel $O_{e,f}^m$ at a location (e, j) in the corresponding output feature map of index m in the M output feature maps.

In one example, for 3-D filter 210-1 and 3-D input 220-1, each 2-D filter 212 in the C 2-D filters in 3-D filter 210-1 may correspond to a respective input feature map 222 in 3-D input 220-1 and may be used to convolve with (e.g., filter) the corresponding input feature map 222, where each pixel in a sliding window 224 in input feature map 222 may be multiplied with a corresponding pixel in 2-D filter 212 to generate a product, and the products for all pixels in sliding window 224 may be summed to generate a partial sum. The partial sums for the C 2-D filters 212 (and corresponding input feature map 222) may be added together to generate an output pixel 232 at a location (e, f) on output feature map 230-1-1 in 3-D output 230-1. Sliding window 224 may be shifted on all C input feature maps 222 in 3-D input 220-1 based on the strides D in the two dimensions to generate another output pixel 232 at a different location on output feature map 230-1-1 in 3-D output 230-1. Sliding window 224 may be repeatedly shifted together on all C input feature maps 222 until all output pixels 232 on output feature map 230-1-1 in 3-D output 230-1 are generated.

Each 3-D filter 210-2, . . . , or 210-M may be used to convolve with 3-D input 220-1 as described above with respect to 3-D filter 210-1 to generate each respective output feature map 230-1-2, . . . , or 230-1-M in 3-D output 230-1. Similarly, each 3-D filter 210-1, . . . , or 210-M may be used to convolve with 3-D input 220-N as described above with respect to 3-D filter 210-1 and 3-D input 220-1 to generate each respective output feature map 230-N-1, . . . , or 230-N-M in 3-D output 230-N.

Operation of a neural network (e.g., conducting inference), as illustrated by the examples discussed above, generally involves fetching input data (or input activations) and filter data (e.g., weights), executing multiply-and-accumulate (MAC) operations on the input data and the filter data in parallel for each node in a layer, and providing output activations. Optimum performance of a neural network, for example, measured by response time, can be achieved when a hardware architecture is capable of highly parallelized computations. Special-purpose or domain-specific neural network processors can achieve better performance than both CPUs and GPUs when executing a neural network. Neural network processors can employ a spatial architecture including a processing element (PE) array, in which the processing elements may form processing chains and can pass data directly from one processing element to another. This can significantly reduce the number of memory transactions. In some examples, the weights or inputs can be pre-loaded into the processing element array. In some examples, neural network processors can also include an on-chip buffer (referred to as a local memory or a state buffer) that can store values read from external memory (e.g., a DRAM), and that can distribute values to multiple computing engines in the processor. The computing engines can further include a small, local register file (e.g., a small memory) for storing intermediate results. Having an on-chip memory hierarchy can improve the efficiency of the operation of a neural network by reducing memory latencies.

Figure 3:
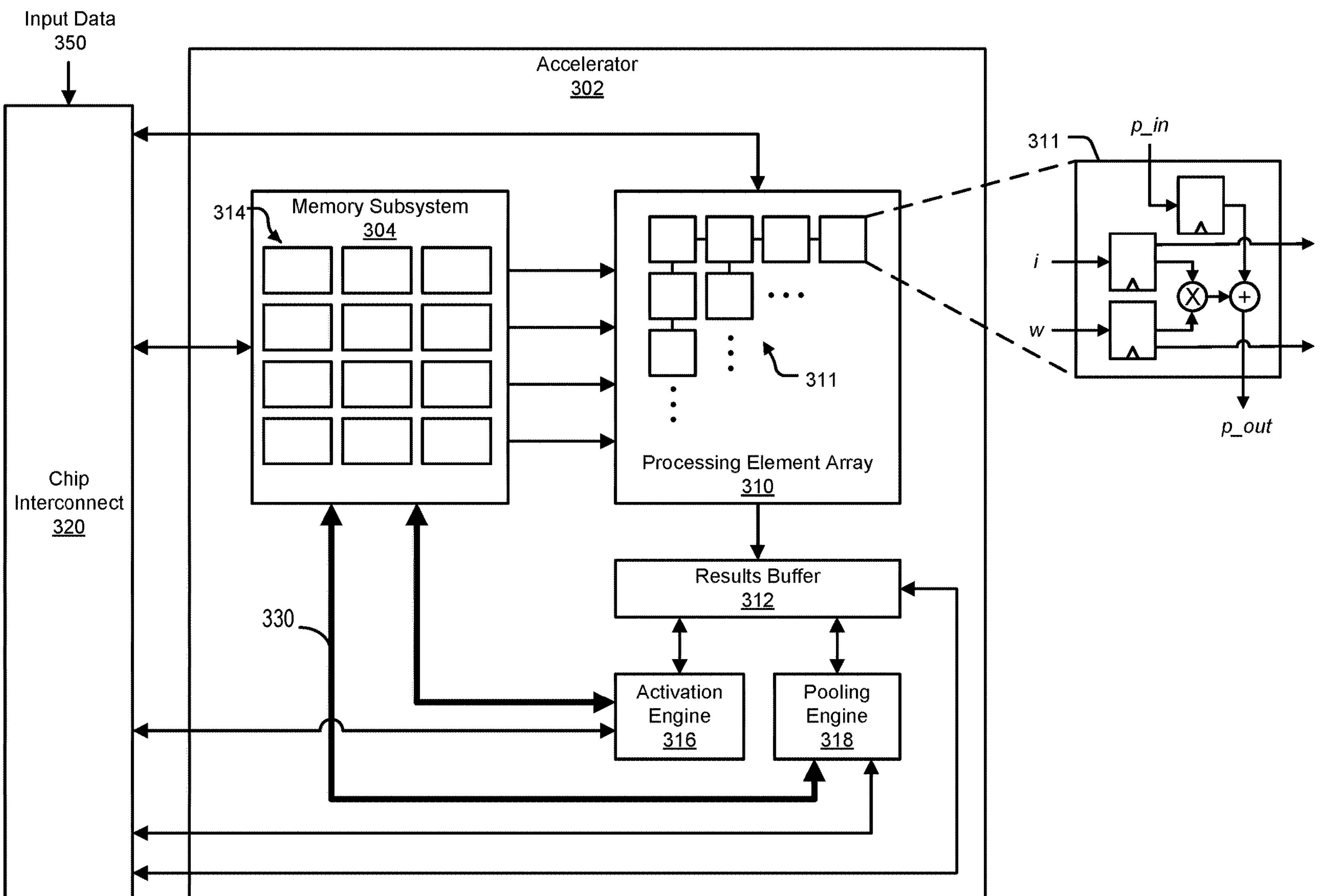
FIG. 3 is a simplified block diagram illustrating an example of an integrated circuit device for performing neural network operations according to certain embodiments.

FIG. 3 is a block diagram illustrating an example of an integrated circuit device for performing neural network operations, such as tensor operations, according to certain embodiments. The example shown in FIG. 3 includes an accelerator 302. In various examples, accelerator 302 can execute computations for a set of input data (e.g., input data 350) using a processing element array 310, an activation engine 316, and/or a pooling engine 318. In some examples, accelerator 302 may be an integrated circuit component of a processor, such as a neural network processor. The processor may have other integrated circuit components, including additional accelerator engines.

In some embodiments, accelerator 302 may include a memory subsystem 304 (e.g., a state buffer) that includes multiple memory banks 314. Each memory bank 314 can be independently accessible, such that the read of one memory bank is not dependent on the read of another memory bank. Similarly, writing to one memory bank may not affect or limit writing to a different memory bank. In some cases, each memory bank can be read and written at the same time. Various techniques can be used to have independently accessible memory banks 314. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 304 can permit simultaneous access to the read or write channels of multiple memory banks. As another example, the memory subsystem 304 can include arbitration logic such that arbitration between, for example, the outputs of multiple memory banks 314 can result in more than one memory bank's output being used. In these and other examples, though globally managed by the memory subsystem 304, each memory bank can be operated independently of any other.

Having the memory banks 314 independently accessible can increase the efficiency of accelerator 302. For example, values can be simultaneously read and provided to each row of processing element array 310, so that the entire processing element array 310 can be in use in one clock cycle. As another example, memory banks 314 can be read at the same time that results computed by processing element array 310 are written to memory subsystem 304. In contrast, a single memory may be able to service only one read or write at a time. With a single memory, multiple clock cycles can be required, for example, to read input data for each row of processing element array 310 before processing element array 310 can be started.

In various implementations, memory subsystem 304 can be configured to simultaneously service multiple clients, including processing element array 310, activation engine 316, pooling engine 318, and any external clients that access memory subsystem 304 over a communication fabric 320. In some implementations, being able to service multiple clients can mean that memory subsystem 304 has at least as many memory banks as there are clients. In some cases, each row of processing element array 310 can count as a separate client. In some cases, each column of processing element array 310 can output a result, such that each column can count as a separate write client. In some cases, output from processing element array 310 can be written into memory banks 314 that can then subsequently provide input data for processing element array 310. As another example, activation engine 316 and pooling engine 318 can include multiple execution channels, each of which can be separate memory clients. Memory banks 314 can be implemented, for example, using static random access memory (SRAM).

In various implementations, memory subsystem 304 can include control logic. The control logic can, for example, keep track of the address spaces of each of memory banks 314, identify memory banks 314 to read from or write to, and/or move data between memory banks 314. In some implementations, memory banks 314 can be hardwired to particular clients. For example, a set of memory banks 314 can be hardwired to provide values to the rows of processing element array 310, with one memory bank servicing each row. As another example, a set of memory banks can be hard wired to receive values from columns of processing element array 310, with one memory bank receiving data for each column.

Processing element array 310 is the computation matrix of accelerator 302. Processing element array 310 can, for example, execute parallel integration, convolution, correlation, and/or matrix multiplication, among other things. Processing element array 310 may include multiple processing elements 311, arranged in rows and columns, such that results output by one processing element 311 can be input directly into another processing element 311. Processing elements 311 that are not on the outside edges of processing element array 310 thus can receive data to operate on from other processing elements 311, rather than from memory subsystem 304.

In various examples, processing element array 310 uses systolic execution, in which data arrives at each processing element 311 from different directions at regular intervals. In some examples, input data can flow into processing element array 310 from the left and weight values can be loaded at the top. In some examples weights and input data can flow from the left and partial sums can flow from top to bottom. In these and other examples, a multiply-and-accumulate operation moves through processing element array 310 as a diagonal wave front, with data moving to the right and down across the array. Control signals can be input at the left at the same time as weights, and can flow across and down along with the computation.

In various implementations, the numbers of columns and rows in processing element array 310 may determine the computational capacity of processing element array 310. For example, the number of rows in processing element array 310 may determine the number of input feature maps that can be processed in parallel, and the number of columns in processing element array 310 may determine the number of filter sets that can be applied in parallel to input data. The number of rows in processing element array 310 may also determine the memory bandwidth for achieving the maximum utilization of processing element array 310. Processing element array 310 can have, for example, 64 columns and 128 rows, or some other number of columns and rows.

An example of a processing element 311 is illustrated in an inset diagram in FIG. 3. As illustrated by this example, processing element 311 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing element 311.

In the illustrated example, an input from above can include a partial sum, pin, provided either from another processing element 311 or from a previous round of computation by processing element array 310. When starting a computation for a new set of input data, the top row of processing element array 310 can receive a fixed value for p_in, such as zero. As illustrated by this example, i and w are multiplied together and the result is summed with p_in to produce a new partial sum, p_out, which can be input into another processing element 311. Various other implementations of processing element 311 are possible.

Outputs from the last row in processing element array 310 can be temporarily stored in a results buffer 312 (e.g., partial sum (PSUM) buffer). The results can be intermediate results, which can be written to memory banks 314 to be provided to processing element array 310 for additional computation. Alternatively, the results can be final results, which, once written to memory banks 314 can be read from memory subsystem 304 over communication fabric 320, to be output by the system.

In some implementations, accelerator 302 includes an activation engine 316. In these implementations, activation engine 316 can combine the results from processing element array 310 into one or more output activations. For example, for a convolutional neural network, convolutions from multiple channels can be summed to produce an output activation for a single channel. In other examples, accumulating results from one or more columns in processing element array 310 may be needed to produce an output activation for a single node in the neural network. In some examples, activation engine 316 can be bypassed.

In various examples, activation engine 316 can include multiple separate execution channels. In these examples, the execution channels can correspond to the columns of processing element array 310, and can perform an operation on the outputs of a column, the result of which can be stored in memory subsystem 304. In these examples, activation engine 316 may be able to perform between 1 and N parallel computations, where N is equal to the number of columns in processing element array 310. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, accelerator 302 can include a pooling engine 318. Pooling is the combining of outputs of the columns of processing element array 310. Combining can include for example, computing a maximum value, a minimum value, an average value, a median value, a summation, a multiplication, or another logical or mathematical combination. In various examples, pooling engine 318 can include multiple execution channels that can operating on values from corresponding columns of processing element array 310. In these examples, pooling engine 318 may be able to perform between 1 and N parallel computations, where N is equal to the number of columns in processing element array 310. In various examples, execution channels of pooling engine 318 can operate in parallel and/or simultaneously. In some examples, pooling engine 318 can be bypassed.

Herein, activation engine 316 and pooling engine 318 may be referred to collectively as execution engines. Processing element array 310 is another example of an execution engine. Another example of an execution engine is a Direct Memory Access (DMA) engine, which may be located outside accelerator 302 and may transfer data between accelerator 302 and an external storage device, such as a DRAM device.

Input data 350 can arrive over communication fabric 320. Communication fabric 320 can connect accelerator 302 to other components of a processor, such as a DMA engine that can obtain input data 350 from an Input/Output (I/O) device, a storage drive, or a network interface.

Input data 350 can be, for example one-dimensional data, such as a character string or numerical sequence, or two-dimensional data, such as an array of pixel values for an image or frequency and amplitude values over time for an audio signal. In some examples, input data 350 can be three-dimensional, as may be the case with, for example, the situational information used by a self-driving car or virtual reality data. In some implementations, memory subsystem 304 can include a separate buffer for input data 350. In some implementations, input data 350 can be stored in memory banks 314 when accelerator 302 receives input data 350.

In some examples, accelerator 302 can implement a neural network processing engine. In these examples, accelerator 302, for a set of input data 350, can execute a neural network to perform a task for which the neural network was trained. Executing a neural network on a set of input data can be referred to as inference or performing inference.

The weights for the neural network can be stored in memory subsystem 304, along with input data 350 on which the neural network will operate. The neural network can also include instructions, which can program processing element array 310 to perform various computations on the weights and the input data. The instructions can also be stored in memory subsystem 304, in memory banks 314, or in a separate instruction buffer. Processing element array 310 can output intermediate results, which represent the outputs of individual layers of the neural network. In some cases, activation engine 316 and/or pooling engine 318 may be enabled for computations called for by certain layers of the neural network. Accelerator 302 can store the intermediate results in memory subsystem 304 for inputting into processing element array 310 to compute results for the next layer of the neural network. Processing element array 310 can further output final results from a last layer of the neural network. The final results can be stored in memory subsystem 304 and then be copied out to host processor memory or to another location.

In some embodiments, mapping the tensor operation described above with respect to FIG. 2 and Equation (1) to a PE array (e.g., PE array 310) for execution may include mapping each of the M 3-D filters to a respective column of the PE array, and mapping each input feature map of the C input feature maps (e.g., C channels) in a 3-D input to a respective row of the PE array. For example, the H×W pixels in each 2-D input feature map may be flattened to form a one-dimensional vector and mapped to a row of the PE array. The C×R×S weights or pixels in each 3-D filter may be flattened to form a one-dimensional vector and mapped to a column of the PE array. Partial sums may be accumulated vertically in each column. In cases where a batch including N 3-D inputs each including C channels are processed, each row of the PE array may be mapped to N 2-D input feature maps.

The movement of data, such as input pixels, filter weights, and partial sums to be accumulated, between PEs can reduce the access to the local memory or off-chip memory. In some embodiments, the input feature map can be stationary and the weights of the filters can be shifted, which may be referred to as an "image-stationary" model. In some embodiments, a "weight-stationary" model may be used, where the weights of the filters are stationary (preloaded from a local memory into the registers in the PE array) and the image is moving (loaded from the local memory during computation), in order to minimize the cost of the movement of the weights. In some embodiments, the output of a PE may be stored in the register at the PE and remains stationary to minimize the cost of the movement of the partial sums, where the input feature maps and weights may move through the PE array and the local memory.

In many neural network models, the size of the data used in each layer, including the input data, the weights (or filters), and the output data, can be very large. For example, a convolutional neural network may include thousands or more of processing nodes and millions or more of weights and input data elements. Neural network models developed to perform complex tasks may have high demand on computational power and local memory space. For example, some applications may need almost instantaneous inference results with minimal latency and high throughput, and some applications may use large feature maps and/or weight matrices. The underlying hardware for implementing a neural network, such as a computing system including a GPU, a TPU, a processing element array, or another processing engine, may generally have a certain number of processing elements (e.g., equal to or less than about 128×128 processing elements) pre-configured in columns and/or rows), and a local memory (sometimes referred to as a state buffer) having a finite size (e.g., a few megabytes) and a maximum data read/write bandwidth. Therefore, the neural network processor may not have sufficient local memory to simultaneously store the weights and feature maps used for the computation and may not have sufficient processing elements to perform large tensor operations. In addition, intermediate results may be saved to the local memory for use by subsequent operations. Furthermore, data transfer between the local memory of the neural network processor and the system memory (e.g., a DRAM on another chip or circuit board) may have a finite bandwidth, and thus it may take time to load a large tensor from the system memory to the local memory or save a large tensor from the local memory to the system memory.

As such, many neural network models may be executed by processing units in a piecemeal fashion in which a large tensor operation may be divided into many small tensor operations using small tensors, such as a subset of weights and/or a subset (e.g., a tile) of a feature map. Tensors used by the neural network processor (including static variables such as filters) and tensors generated by the neural network processor (e.g., intermediate results) may need to be appropriately allocated to and removed from the local memory during the execution of the neural network model, such that tensors used for a computation operation by the neural network processor may be available at the relatively small local memory with a minimum latency, in order to fully utilize resources (e.g., the computing power) of the neural network processor to achieve a high performance (e.g., high throughput or short processing time). Dividing a large tensor operation into many smaller tensor operations can reduce the constraint on resource allocation (e.g., local memory allocation), and can also reduce the latency of loading tensors used for the small tensor operation and/or the latency of saving smaller tensors (e.g., for memory spilling).

The memory allocation, tensorization (transforming a large tensor operation to multiple smaller tensor operations), and data transfer may be determined by a compiler that generates and schedules instructions to be executed by the neural network processor and other execution engines of a computing system to implement a neural network model. The instructions may generally include instructions for memory load operations that read input data (e.g., input feature maps) and static variables (e.g., weights, such as filter tensors for a convolutional neural network), instructions for computation operations that use the input data and the static variables to perform arithmetic operations, and memory save operations that save outputs (e.g., intermediate results) of the computation operations to the system memory to make room for other input tensors for other operations.

Accelerator 302 may perform instructions generated by a compiler using a neural network model, such as a ResNet-50 model. The neural network model may be represented by a data flow graph (or a computation graph) where each node (e.g., vertex) in the graph may represent an operation, and connections (e.g., edges) between the nodes may represent the data flow or data dependency. The compiler may traverse the data flow graph and perform shape inference on the neural network model, for example, to determine the sizes of the data used for each operation. The compiler may add, to the neural network model, operations for padding the input feature map for each input channel, based on parameters of a convolution operation, such as the size of an original input feature map, the size of a filter (e.g., kernel), the stride used for the convolution, the memory alignment, and the size of the processing element array. Optionally, the compiler may add to the neural network model operations for dividing input data into multiple partitions and dividing the convolution operation into multiple sub-operations. The compiler may map the operations of the neural network model to the computing system, such as memory subsystem 304 and processing element array 310 in accelerator 302, pooling engines 318, activation engines 316, DMA engines (not shown in FIG. 3), and the like, and generate and schedule instructions to be performed by these different components of the computing system.

Figure 4:
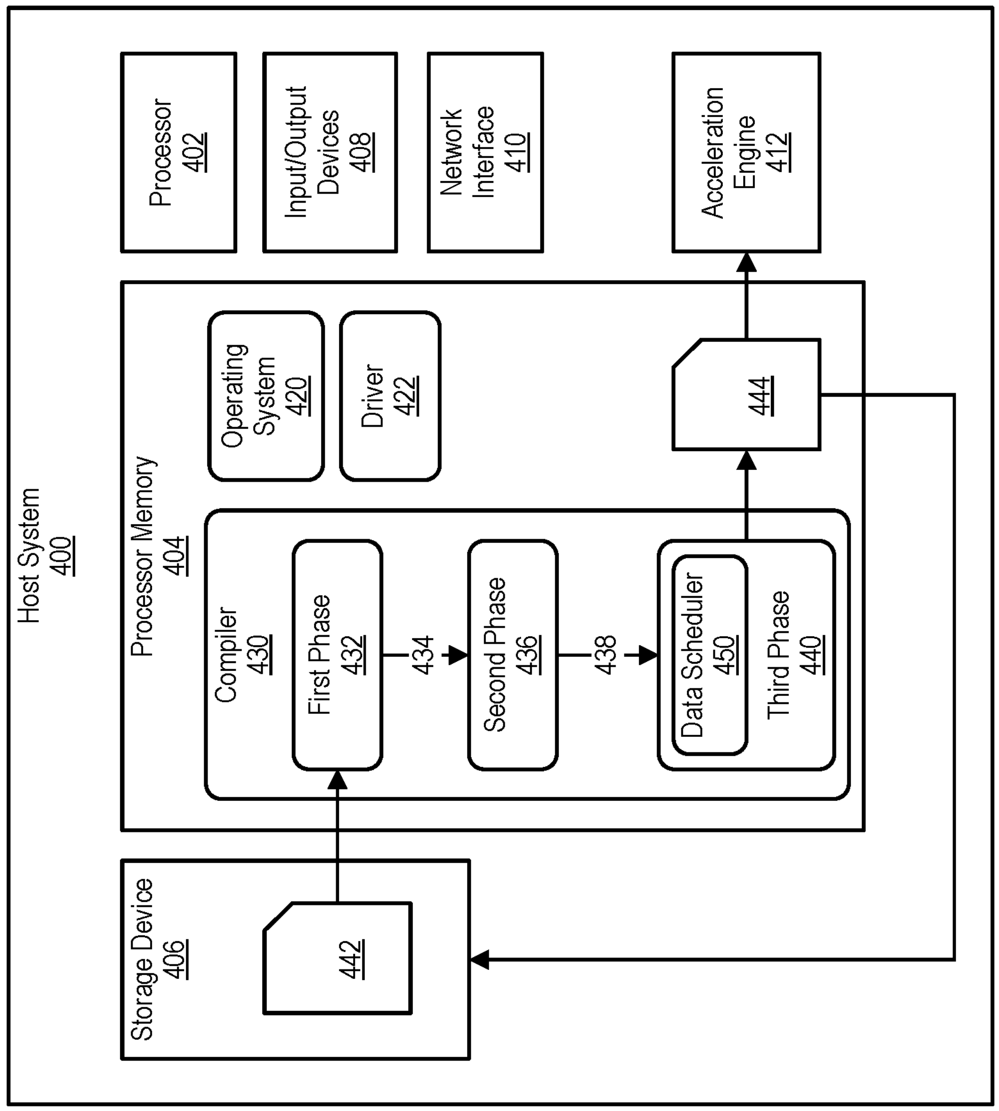
FIG. 4 includes a block diagram illustrating an example of a host system that may be used to execute a compiler.

FIG. 4 includes a block diagram illustrating an example of a host system 400 that may be used to execute a compiler 430. The illustrated host system 400 is an example of a computing device, and includes a processor 402, a processor memory 404, at least one storage device 406, various Input/Output (I/O) devices 408, and at least one network interface 410. In the example of FIG. 4, host system 400 also includes an acceleration engine 412, which is an integrated circuit device that can accelerate certain operations or computations performed by host system 400. In various examples, host system 400 can be implemented as a server in a data center, a desktop computer, a laptop computer, a tablet computer, or a smartphone, among other examples. In some examples, operations or components discussed below as being performed or included in host system 400 can be performed or included in other computer devices. For example, compiler 430 can execute on host system 400 while acceleration engine 412 is located at a different host system.

Processor 402 is an integrated circuit device that can execute program code, in the form of instructions. The program code can be for various software applications or tools, such as an operating system 420 or the illustrated compiler 430. While processor 402 is executing a program, the instructions for the program can be stored in processor memory 404. The instructions can also be stored elsewhere, such as on storage device 406, and can be loaded into processor memory 404 when needed by processor 402. Processor 402 can also use processor memory 404 for temporary storage of other data on which processor 402 is operating. In various examples, processor memory 404 is a volatile memory type, such as a type of Random Access Memory, though non-volatile memory types can, alternatively or additionally, be used for processor memory 404.

Storage device 406 is an example of a device that can include non-volatile memory. For example, storage device 406 can be a magnetic disk drive, a solid state drive, or an optical drive, among other examples. Storage device 406 can further be non-transitory, such that program code and other data stored on storage device 406 remains present when storage device 406 is not powered on.

Storage device 406 is one example of a peripheral device, which are components that can be coupled to host system 400 to add functionality to host system 400. Other examples of peripheral devices include I/O devices 408 and network interface 410. I/O devices 408 can include user input and output devices, such as keyboards, mice, touch screens, microphones, display screens, speakers, printers, and scanners, among other examples. Network interface 410, which can be implemented using a network interface card, can provide access to one or more networks. Network interface 410 can include, for example, a physical port for connecting a network cable and/or wireless antennas for communicating with Wi-Fi and/or cellular networks. Network interface 410 can also be described as an I/O device.

Acceleration engine 412 is also another type of peripheral device or I/O device. Acceleration engine 412 is a device that is purpose-built to perform certain operations that can be performed by processor 402, but can be performed faster by acceleration engine 412. For example, acceleration engine 412 can be a neural network accelerator, and, as such, may be able to perform the large scale, parallel computations of a neural network more efficiently than when the computations are performed by processor 402. As another example, acceleration engine 412 can be a graphics processing unit (GPU), and may be optimized to perform the computations needed for graphics rendering. Other examples of devices that can be implemented by acceleration engine 412 include cryptographic accelerators, compression and decompression accelerators, 3-D accelerators, regular expression accelerators, security accelerators, and others.

In various examples, acceleration engine 412 can execute program code to perform certain operations. For example, when acceleration engine 412 is a neural network accelerator, acceleration engine 412 can be programmed to execute a particular neural network, such as one that performs image recognition or one that performs machine translation. As a further example, to support the execution of a neural network, acceleration engine 412 can be programed to perform operations such as copying data for the neural network from processor memory 404 (for example) into acceleration engine 412, copying input data for the neural network from processor memory 404 into acceleration engine 412, and/or copying results from acceleration engine 412 into processor memory 404, among other examples.

To generate program code for acceleration engine 412, in various examples, host system 400 can execute compiler 430. Compilers, in general, are software programs that translate program code written in a human-readable language into a format (e.g., machine instructions) that can be read and processed by an integrated circuit device. In the example shown in FIG. 4, acceleration engine 412 is a neural network accelerator and compiler 430 is for compiling a neural network description into instructions to be executed by acceleration engine 412. When acceleration engine 412 implements a different type of accelerator, another compiler can be used.

Compiler 430 can be activated, for example, when operating system 420 receives keyboard, mouse, touchscreen, voice commands, or other inputs from the I/O devices 408. The inputs can further include parameters for compiler 430, such as input code 442 to compile and configuration options for the compilation process. Once compiler 430 is activated, processor 402 can load the instructions for compiler 430 into processor memory 404, and can execute the instructions.

In the example shown in FIG. 4, compiler 430 includes a first stage 432, a second stage 436, and a third stage 440, which each perform different operations to produce compiled code 444. In other examples, compiler 430 can combine the operations of first stage 432, second stage 436, and/or third stage 440 into fewer stages, or can divide the operations of one of the stages into multiple stages.

First stage 432 can receive and process input code 442. Input code 442 can describe a program in a high-level programming language, such as Java, C++, or Tensorflow, among many other examples. Input code 442 can describe, for example, steps to perform image recognition, speech recognition, machine translation, or other operations. Input code 442 can be obtained, for example, from storage device 406. Alternatively, though not illustrated here, input code 442 may be located in processor memory 404 or can be obtained from a network location, using network interface 410. Processing of input code 442 can include sorting the operations described in input code 442 into layers, where the outputs of one layer provide the inputs to a next layer. Processing can also include identifying steps to be performed by the processor 402, rather than by the acceleration engine 412. For example, the processor 402, through the execution of a driver 422, may need to perform steps such as configuring DMA descriptors for moving data into or out of the acceleration engine 412, among other examples. Output 434 of first stage 432 can be organized, for example, in the layers, nodes, and connections between nodes of a neural network.

Second stage 436 can perform intermediate processing on this output 434. For example, the operations performed in any one layer, or at any one node in a layer, may be too many for acceleration engine 412 to perform at the same time. Acceleration engine 412 may, for example, have a limited amount of locale storage space for the data needed for a computation, or the computations may be more than acceleration engine 412 can perform at one time. In this example, first stage 432 can break the operations of the layer or node down into smaller operations, which can fit into the acceleration engine's local memory and/or can fit into the computing capacity of acceleration engine 412. Processing of output 434 of first stage 432 can include other steps, such as scheduling, or determining the order in which acceleration engine 412 and/or processor 402 will perform operations, among other examples.

In various examples, output 438 of second stage 436 includes the various steps to be performed by components of acceleration engine 412, in the order that the steps are to be performed. Output 438 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

Third stage 440 can operate on output 438 of second stage 436, and perform various steps before producing the instructions that are to be executed by acceleration engine 412. These steps can include, for example, removing redundant dependencies, resolving or handling dependencies between nodes by inserting synchronization instructions into the code, identifying possibly optimizations in memory usage or memory bandwidth usage, and other operations. In some examples, third stage 440 can include a data scheduler 450 to determine the order in which instructions are executed by acceleration engine 412.

The output of third stage 440 is compiled code 444, which may include machine instructions in binary format. In some examples, compiled code 444 can be stored in processor memory 404. Alternatively or additionally, compiled code 444 can be copied to storage device 406 or to a network location. As noted above, acceleration engine 412 may be located at a different host system, in which case the compiled code 444 can be sent over network interface 410 to the other host system.

In the example shown in FIG. 4, host system 400 can execute a driver 422, which can also be referred to as a device driver or runtime driver, that manages acceleration engine 412. Driver 422 can provide an interface between applications executing on host system 400 (or on another host system) and acceleration engine 412. For example, driver 422 can provide an Application Program Interface (API) that defines functions for feeding input data to acceleration engine 412 and defining the operation to perform on the input data. In this and other examples, driver 422 can configure acceleration engine 412 to perform the operation. For example, driver 422 can identify a neural network that acceleration engine 412 is to execute, as well as the location in processor memory 404 or on storage device 406 where compiled code 444 for the neural network is located. Driver 422 can further load into acceleration engine 412 or cause acceleration engine 412 to load compiled code 444, can load or cause acceleration engine 412 to load the input data on which the neural network is to operate, and/or can cause acceleration engine 412 to being executing on the input data. Once acceleration engine 412 has finished, acceleration engine 412 can notify driver 422, and driver 422 can deliver a result back to the application that requested the result.

Data transfers between the local memory of a neural network processor and the system memory, including loading input tensors from the system memory to the local memory and saving intermediate output tensors from the local memory to the system memory to make room for other input tensors for other operations may be performed using a direct memory access (DMA) engine, in order to limit the involvement of the host processor. A DMA engine may use memory descriptors to perform the data transfers.

Figure 5:
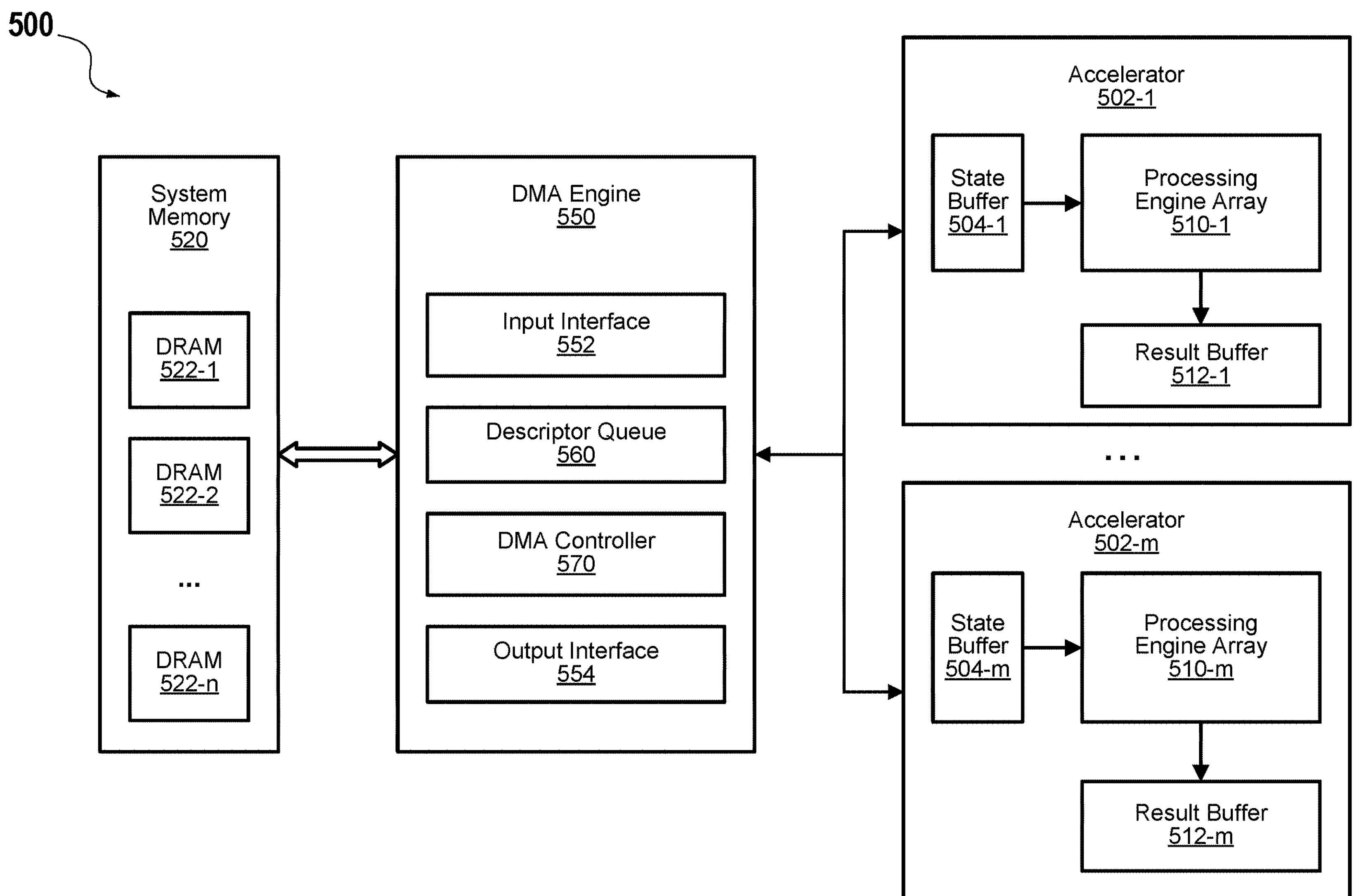
FIG. 5 illustrates an example of a computing system according to certain embodiments.

FIG. 5 illustrates an example of a computing system 500 according to certain embodiments. In the illustrated example, computing system 500 includes a DMA engine 550, system memory 520, and one or more accelerators 502-1 to **502-*m*. Computing system 500 may include other components not specifically shown, such as a host processor. Accelerators 502-1 may be a neural network accelerator (e.g., a neural network processor or tensor processing unit), and may include a processing element array 510-1 (e.g., a systolic array), a state buffer 504-1, and a result buffer 512-1 as described above with respect to FIG. 3. Processing element array 510-1 may include an array of processing elements arranged in rows and columns. Each processing element is capable of performing a multiply-and-add operation. State buffer 504-1 may be used to store input data such as feature map values and weight values for processing element array 510-1, and/or may be used to store intermediate outputs that may be used in subsequent layers. During operation, the input data may be shifted into processing element array 510-1 from state buffer 504-1 along the rows of the array. The computation results of the processing elements are accumulated along the column direction. The output data of the columns (e.g., partial sum) may be stored in result buffer 512-1, and may be further processed by other processing engines (such as the pooling engine and/or activation engine not shown in FIG. 5) and saved to state buffer 504-1. Other accelerators in computing system 500 such as accelerator 502-*m* may have a similar architecture as accelerator 502-1** described above.

In many instances, tensors processed by computing system 500 may have thousands or even millions of elements. Because not all elements of a tensor can fit within accelerators 502-1 to **502-*n* at the same time, system memory 520 can be used to store data that are not currently being processed in accelerators 502-1 to 502-*m*. System memory 520 can also be used to facilitate data exchanges between accelerators 502-1 to 502-*m* (e.g., for gradient exchange during training). As computations are carried out, data used by accelerators 502-1 to 502-*m* may be transferred from system memory 520 into the corresponding accelerator, and data not being used by accelerators 502-1 to 502-*m* can be transferred from the respective accelerator to system memory 520. System memory 520 can be implemented using one or more DRAM devices 522-1 to 522-*n*** and/or other types of memory devices. In other implementations, system memory can be implemented, for example, using static random access memory (SRAM), flash memory, 3D cross-point memory, or any combination thereof.

In some implementations, data transfers between system memory 520 and other components of computing system 500 may involve a host processor (not shown) to issue read and write commands to system memory 520. Such memory accesses through a host processor may use processing time of the host processor and may incur unnecessary latency, especially when the host processor is not a consumer or generator of the data being accessed. To bypass the host processor, DMA engine 550 can be used to directly exchange data between system memory 520 and accelerators 502-1 to **502-*m***.

DMA engine 550 may include a DMA controller 570, a descriptor queue 560, an input interface 552, and an output interface 554. Descriptor queue 560 can be implemented as, for example, a circular buffer or ring queue, and can be configured to store a set of memory descriptors used by DMA engine 550 to exchange data between system memory 520 and other components of computing system 500. For example, when an accelerator **502-*m* has data to store in system memory 520 or is requesting data from system memory 520, a memory descriptor providing a source address and a destination address can be placed in descriptor queue 560 to initiate the transfer. A memory descriptor may also include other information, such as the number of elements to transfer, data size, transfer unit, transfer type, and the like. In some implementations, DMA engine 550 may include multiple descriptor queues. For example, DMA engine 550 may include a descriptor queue for writing data into system memory 520, and a descriptor queue for reading data from system memory 520. In some implementations, DMA engine 550 may implement multiple data transmission channels (e.g., different channels for different components of computing system 500), and each transmission channel may have its own descriptor queue or pair of descriptor queues for both transfer directions. Furthermore, DMA engine 550** may implement a destination descriptor queue that can be used to facilitate multicast operations.

DMA controller 570 may be used to manage the operations of DMA engine 550. For example, DMA controller 570 may maintain head and tail pointers for descriptor queue 560 of DMA engine 550. DMA controller 570 may monitor the number of available entries in descriptor queue 560 to prevent queue overflow. In some implementations, DMA controller 570 may also maintain completion statuses and generate interrupts for components of computing system 500. DMA controller 570 may process the memory descriptors in descriptor queue 560 by reading data from the source designated in the memory descriptor via input interface 552, and writing the data to a target destination designated in the memory descriptor via output interface 554. As such, input interface 552 may issue read operations to obtain the data being transferred, and output interface 554 may issue write operations to place the data into the target destination. In some implementations, DMA controller 570 can also perform a multicast operation by reading a data set once and writing the data set to multiple destinations.

As described above, DMA engine 550 may be shared by multiple (e.g., 4 or more) processing engines (e.g., accelerators 502-1 to **502-*m*) in computing system 500 and may include interfaces that may have limited bandwidth (e.g., about 128 or 256 B/cycle). Retrieving the memory descriptors, initializing the DRAM access, and regularly refreshing the DRAM may incur additional overhead for DMA transfers. Thus, DMA operations may have a long latency, a low bandwidth, and a low throughput. In many applications, the size of input tensors used by a neural network model and output tensors generated by the neural network model can be hundreds of times greater than the capacity of the local memory. Thus, a processing engine may need to access the system memory tens or hundreds of times or more through DMA engine 550 to transfer the small tensors. Due to the latency and overhead of each DMA access, accessing the system memory tens or hundreds of times through DMA engine 550** can cause prolonged latencies and prevent practical applications of the neural network to some real-time tasks, such as natural language processing or autonomous driving.

According to certain embodiments, to reduce the overhead of performing a large number of DMA operations, a compiler may, after the resource allocation and instruction generation of a typical compiling process, analyze the local memory allocation and usage by the instructions and modify the instructions by, for example, replacing some DMA operations with tensor copy instructions that copy tensors within the local memory without involving the DMA controller. For example, at least some DMA operations for state buffer spilling and reloading may be replaced by tensor copy instructions that can reshape the dimensions (e.g., changing the number of partitions and the number of elements per partition but not the total number of elements) of the tensors to be spilled, and save the reshaped tensors in unused regions of the state buffer that may not have dimensions suitable for storing the original tensors. When the original tensor of a reshaped tensor need to be used by subsequent instructions, another tensor copy instruction may be used to change the reshaped tensor in the state buffer back to its original shape and save the tensor to the state buffer for use by the subsequent instructions.

The tensor copy instructions described above may be performed by a processing engine of the computing system, such as pooling engine 318 or activation engine 316 of accelerator 302. Pooling engine 318 may read from a first region of the state buffer (e.g., memory subsystem 304) and write the read data to a second region in the state buffer. The first region and the second region may have the same two-dimensional shape (e.g., the same number of partitions and the same number of bytes in each partition), or may have different two-dimensional shapes, such as different numbers of partitions and different numbers of elements (e.g., bytes) in each partition, but may have the same total size (number of partitions×number of elements in each partition). Pooling engine 318 or another processing engine (e.g., activation engine 316) may change the shape of the tensor when writing the tensor read from the first region to the second region of the state buffer. Pooling engine 318, activation engine 316, and memory subsystem 304 of accelerator 302 may be on a same chip or may be in a same integrated circuit package. Pooling engine 318 may be connected to memory subsystem 304 through an on-chip bus interface 330 that may read from or write to multiple partitions of the state buffer in parallel. In one example, bus interface 330 between pooling engine 318 and memory subsystem 304 may write to each partition of memory subsystem 304 at a speed of 8 bytes per four clock cycles. There is no initialization or refreshing for the tensor copy operations. The bus interface may be dedicated for communications between pooling engine 318 and memory subsystem 304, and thus there may not be bandwidth competition between tensor copy operations and other operations. As such, the tensor copy instructions may be executed by the computing system at a high speed and with a low latency and a short execution time.

Figure 6:
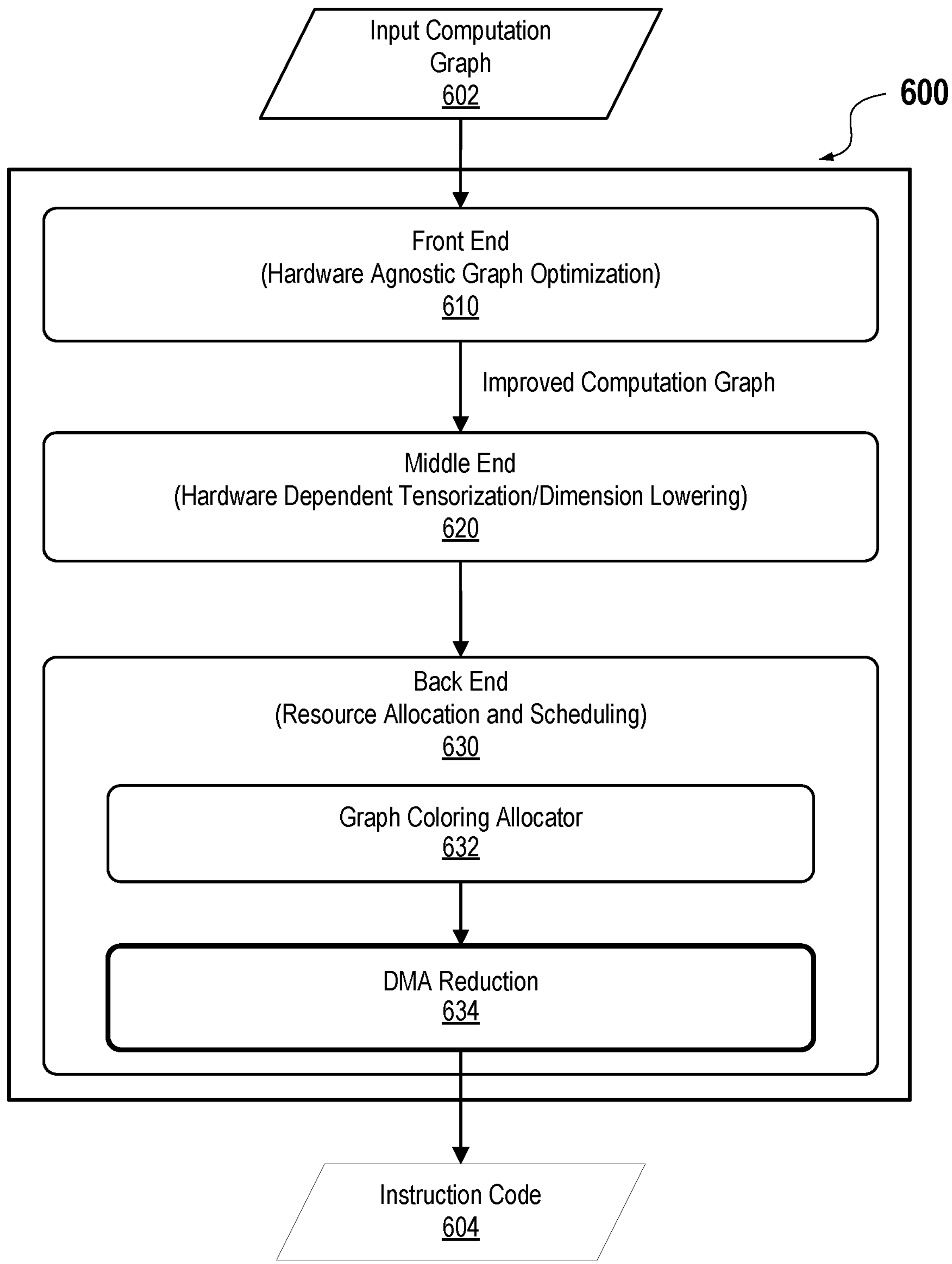
FIG. 6 illustrates an example of a compiler including multiple processing stages for compiling a neural network model according to certain embodiments.

FIG. 6 illustrates an example of a compiler 600 including multiple processing stages for compiling a neural network model according to certain embodiments. Compiler 600 may be an example of compiler 430 shown in FIG. 4. In the illustrated example, compiler 600 may include a front end 610, a middle end 620, and a back end 630, each configured to perform different operations in a process of generating instruction code based on an input neural network model, such as an input computation graph that describes the neural network model. Front end 610, middle end 620, and back end 630 may be executed by one or more processors in a host system, such as processor 402 of host system 400. It is noted that the division of operations of compiler 600 into stages such as front end 610, middle end 620, and back end 630 is for illustration purposes only, in order to facilitate the description of compiler 600. Other arrangements or groupings of the different operations of compiler 600 in the compilation flow may be used to implement the operations of compiler 600.

In the example shown in FIG. 6, front end 610 may receive a neural network model that is described by an input computation graph 602. In other embodiments, the neural network model may be described in a high-level programming language, such as Java, C++, MATLAB, Python, or Tensorflow, among many other examples. Input computation graph 602 may include a plurality of nodes and directed connections (edges) between the nodes. Each node may represent a neural network operation, such as a data transfer (or memory load) operation or a computation operation (e.g., convolution, activation, pooling, or residual add). The connections and the directions of the connections between the nodes may indicate data dependency. In some embodiments, each node of an input computation graph may represent a tensor, a matrix, a vector, or a scalar value, and each edge may represent a function and data dependency.

Front end 610 may perform a general optimization of input computation graph 602, regardless of the underlying hardware that may be used to implement the neural network model.

The input computation graph optimization may include, for example, applying rule-based transformations to fuse some operations such that intermediate results do not need to be maintained, substitute some operations, and/or prune some unnecessary operations. The input computation graph optimization may simplify graph, optimize arithmetic operations, optimize data dependency, optimize graph layout, and the like. The output of front end 610 may be an improved computation graph with reduced computation, memory usage, and/or data transfer.

Middle end 620 may, based on the configuration of the underlying hardware (e.g., accelerator 302 or computing system 500) for implementing the neural network model and the improved computation graph, break tensors and tensor operations at the graph nodes into smaller tensors and smaller tensor operations that can fit into a processing engine's local memory (e.g., memory subsystem 304 of accelerator 302) and/or can fit into the computing capacity of the processing engine (e.g., PE array 310 of accelerator 302). The output of middle end 620 may include operations to be performed by various components of a computing system, including, for example, memory operations, computations, and other operations, and may also indicate dependencies between the operations, such as data dependencies, memory dependencies, or operational dependencies, among other examples.

Back end 630 may perform processing such as resource allocation, instruction scheduling, and code editing, and may generate instructions that can be executed by the computing system. To reduce the number of DMA data transfer operations and the associated overhead, back end 630 may include a DMA reduction block 634 that may analyze the compiled instruction code to determine local memory allocation and utilization by the instructions and find candidate empty regions in the local memory for storing tensors that are to be spilled by DMA save instructions and reloaded by DMA load instructions in the compiled instruction code. A candidate region may have the same dimensions as a tensor to be spilled or may have dimensions different from the dimensions of the tensor to be spilled but may have a total size equal to or greater than the total size of the tensor to be spilled. The compiler may then replace a DMA save instruction for spilling the tensor with a tensor copy instruction that saves content of the tensor to the candidate region within the local memory, where the tensor copy instruction may also change the dimensions (e.g., the number of partitions and the number of elements per partition) of the tensor such that the reshaped tensor may fit in the candidate region. The compiler may also replace a DMA load instruction for reloading the tensor with a tensor copy instruction that may be executed to read the (reshaped) tensor in the candidate region, change the dimensions of the (reshaped) tensor according to the dimensions of the destination of the DMA load instruction, and save the tensor (e.g., in its original dimensions) to the destination of the DMA load instruction. In some embodiments, a group of DMA save instructions for tensor spilling and a group of corresponding DMA load instructions for tensor reloading may be replaced by a set of tensor copy instructions, where the tensor may be reshaped and saved to an empty region of the local memory by a tensor copy operation. In each time the tensor is scheduled to be reloaded to the local memory by a DMA load instruction, the reshaped tensor saved to the empty region of the local memory may be read back, reshaped into the original tensor, and saved to the destination of the DMA load instruction by another tensor copy operation. The output of DMA reduction block 634 may be instruction code 604 that may be performed by a computing system, such as computing system 500.

Figure 7A:
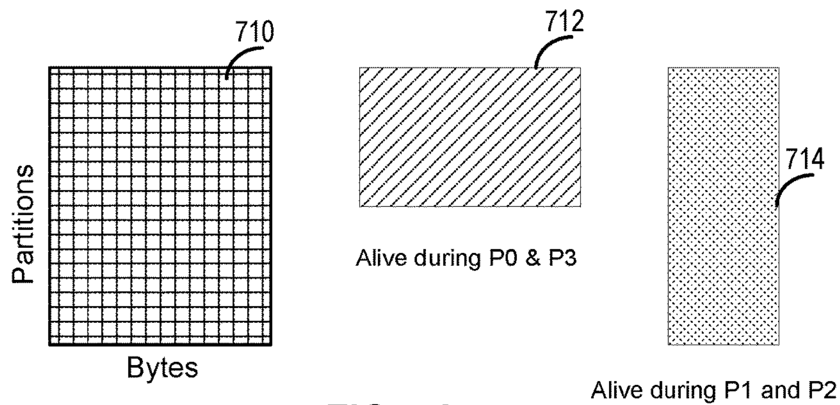
FIG. 7A illustrates examples of tensors used in an example of a state buffer at different time periods during execution of a simplified example of a neural network model.

FIG. 7A illustrates examples of tensors used in an example of a state buffer 710 at different time periods during execution of a simplified example of a neural network model. State buffer 710 may have a two-dimensional structure and may include a plurality of partitions, where each partition may include a plurality of elements (e.g., bytes). A tensor 712 may be generated or used during periods P0 and P3 and thus may need to reside in state buffer 710 at least during periods P0 and P3. In one example, tensor 712 may be part of an output tensor of a tensor operation of a neural network layer performed during period P0, and may need to be used as the input tensor of another tensor operation of a subsequent neural network layer to be performed during period P3. In another example, tensor 712 may be an input tensor loaded into state buffer 710 from a DRAM using a DMA load instruction. A tensor 714 may be generated or used during periods P1 and P2 and thus may need to reside in state buffer 710 at least during periods P1 and P2. In one example, tensor 714 may be part of an output tensor of a tensor operation of a neural network layer performed during period P1, and may need to be used as the input tensor of another tensor operation of a subsequent neural network layer to be performed during period P2. In another example, tensor 714 may be part of an input tensor of tensor operations to be performed during period P1 and P2.

In the simplified example shown in FIG. 7A, tensor 712 may include multiple partitions, where the number of elements in each partition of the multiple partitions may be close to or about the same as the number of elements in each partition of state buffer 710. For example, state buffer 710 may include 128 partitions with 256 KB in each partition (a total size of about 32 MB), and tensor 712 may have a shape of 32 partitions×256 KB/partition. Tensor 714 may also include multiple partitions, where the number of partitions may be close to or about the same as the number of partitions in state buffer 710. For example, tensor 714 may include 100 or more partitions. Therefore, tensor 712 and tensor 714, in their original dimensions, may not be stored in state buffer 710 at the same time, even though the total number of elements in tensor 712 and tensor 714 may be less than or equal to the total number of elements of state buffer 710.

Figure 7B:
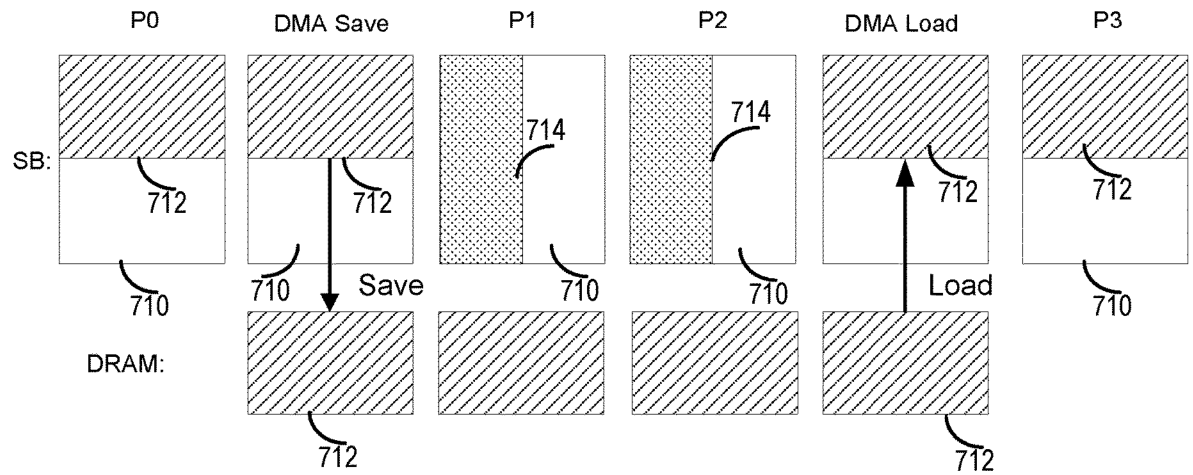
FIG. 7B illustrates an example of implementing the simplified example of the neural network model of FIG. 7A using direction memory access (DMA) instructions for tensor spilling and reloading.

FIG. 7B illustrates an example of implementing the simplified example of neural network model of FIG. 7A using state buffer 710 and DMA operations for tensor spilling and reloading. As illustrated, during period P0, tensor 712 may reside in state buffer 710. Tensor 712 may be loaded into state buffer 710 from a DRAM and used as an input for a tensor operation, or may be saved to state buffer 710 by a tensor operation. During period P1, tensor 714 may need to reside in state buffer 710. Similarly, tensor 714 may be loaded into state buffer 710 from a DRAM and used as an input for a tensor operation, or may be saved to state buffer 710 by a tensor operation. Because the specific dimensions of tensor 712 and tensor 714, state buffer 710 may not be able to hold tensor 712 and tensor 714 at the same time. Therefore, before period P1, tensor 712 may need to be saved into the DRAM using a DMA save instruction, before tensor 714 is written or loaded into state buffer 710 during period P1. Tensor 714 may continue to reside in state buffer and may be used for some tensor operations during period P2. Tensor 712 may need to be used in period P3, and thus may need to be reloaded into state buffer 710 using a DMA load instruction before or at the beginning of period P3 so that tensor 712 may be available in state buffer 710 during period P3. As such, in the illustrated example, a DMA save operation and a DMA load operation may need to be performed to implement the simplified example of the neural network model of FIG. 7A using state buffer 710.

Figure 7C:
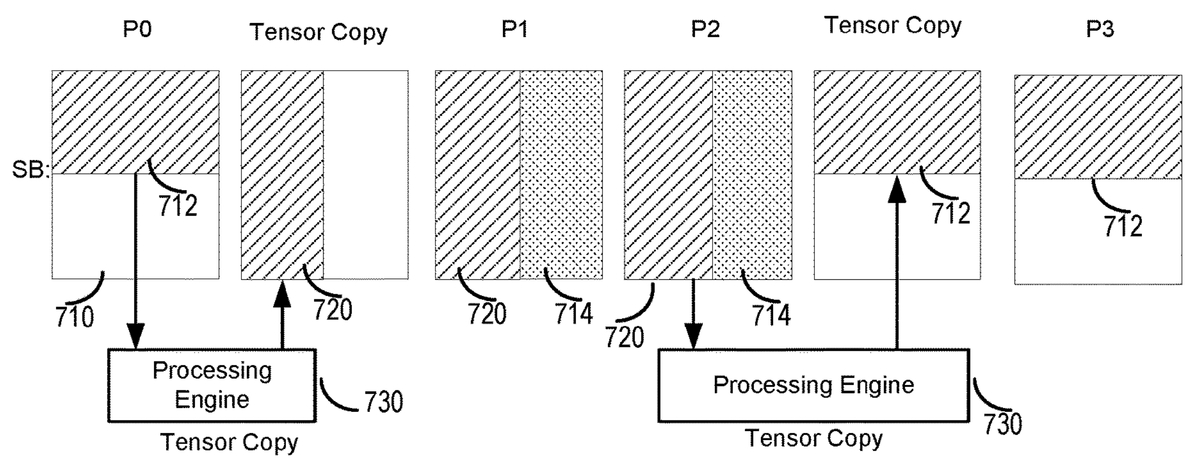
FIG. 7C illustrates an example of implementing the simplified example of the neural network model of FIG. 7A using tensor copy operations that reshape tensors within the state buffer to avoid tensor spilling and reloading according to certain embodiments.

FIG. 7C illustrates an example of implementing the simplified example of the neural network model of FIG. 7A using state buffer 710 and tensor copy operations that reshape tensors within the state buffer to avoid tensor spilling and reloading according to certain embodiments. As described above, during period P0, tensor 712 may reside in state buffer 710. During period P1, tensor 714 may need to reside in state buffer 710. Because the specific dimensions of tensor 712 and tensor 714, state buffer 710 may not be able to hold tensor 712 and tensor 714 in their original shapes (or dimensions) at the same time.

According to techniques disclosed herein, before tensor 714 is written or loaded into state buffer 710 during period P1, a processing engine 730 (e.g., pooling engine 318) may execute a tensor copy instruction to read tensor 712 from state buffer 710, reshape tensor 712 into a tensor 720, and save tensor 720 to state buffer 710. Tensor 720 may have the same total size (and the same content) as tensor 712, but may have a shape different from a shape of tensor 712. For example, tensor 720 may include more partitions than tensor 712 but may have few elements in each partition compared with tensor 712. In one example, tensor 712 may have a shape of 32 partitions×256 elements/partition, whereas tensor 720 may have a shape of 128 partitions×64 elements/partition. In some embodiments, processing engine 730 may write tensor 720 to state buffer 710 after reading and reshaping tensor 712. In some embodiments, processing engine 730 may read a portion of tensor 712 from the state buffer and write the portion of tensor 712 to an appropriate location of the state buffer that tensor 720 may reside, and may then read and write another portion of tensor 712. Tensor 720 may continue to reside in state buffer 710 during period P1 and P2.

Tensor 714 may be written to or loaded into state buffer 710 after tensor 712 is reshaped into tensor 720 and saved in state buffer 710. In the illustrated example, tensor 720 may be saved in a region of state buffer 710 that at least partially overlaps with a region originally allocated to tensor 714 (e.g., the left portion of state buffer 710), and thus tensor 714 may need to be reallocated into a region in state buffer that is different from the originally allocated region of tensor 714. Thus, instructions that load or use tensor 714 may need to be modified to reflect the change of location of tensor 714 in state buffer 710. In some embodiments, tensor 720 may be written into a region that does not overlap with the originally allocated region of tensor 714. For example, tensor 720 may be saved to a right portion of state buffer 710. As such, tensor 714 may be loaded to its originally allocated region, and thus instructions that load or use tensor 714 may not need to be modified. Tensor 714 may continue to reside in state buffer 710 and may be used for some tensor operations during period P2.

To use tensor 712 in period P3, a second tensor copy instruction may be performed by processing engine 730 to read tensor 720 from state buffer 710, reshape tensor 720 back into tensor 712, and save tensor 712 into the allocated location in state buffer 710 before or at the beginning of period P3, so that tensor 712 may be available for use in period P3. Therefore, in the example illustrated in FIG. 7C, tensor 712 does not need to be spilled and reloaded, and thus the DMA save operation and DMA load operation shown in FIG. 7B may not need to be used.

In some embodiments, the tensor to be used in period P3 may have dimensions different from the dimensions of the original tensor 712 and the dimensions of tensor 720. The second tensor copy instruction may read the reshaped tensor 720, reshape it into the desired dimensions, and save the tensor with the desired dimensions to a region of the state buffer for use during period P3.

Figure 8:
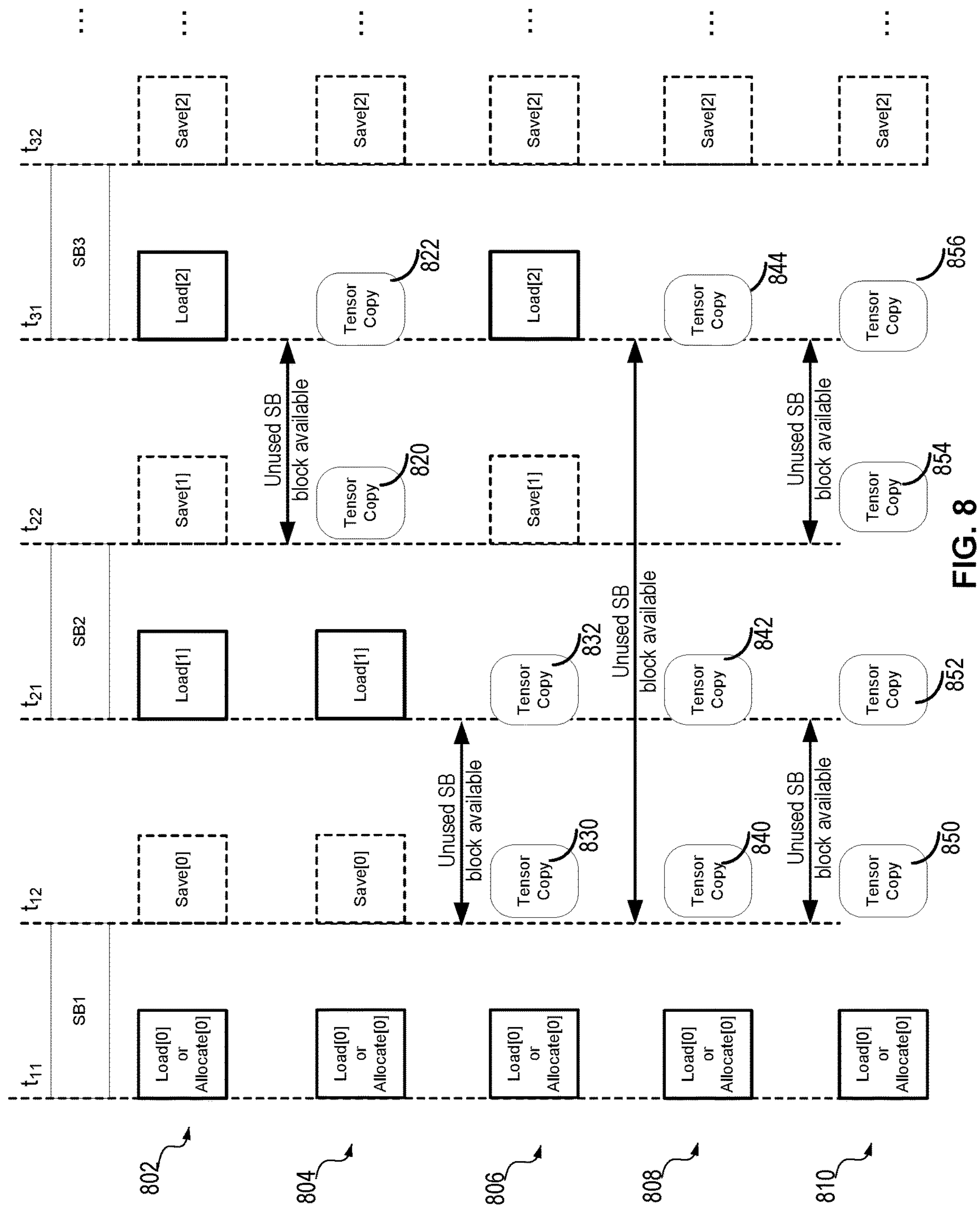
FIG. 8 illustrates examples of using tensor copy instructions to avoid DMA operations for state buffer spilling and reloading according to certain embodiments.

FIG. 8 illustrates examples of using tensor copy instructions to avoid DMA operations for state buffer spilling and reloading according to certain embodiments. In the illustrated example, state buffer regions SB1, SB2, SB3, and the like may store a same tensor (or a same based tensor that may be modified) during different time periods. Thus, state buffer regions SB1, SB2, SB3, and the like may have the same dimensions, such as including p partitions and b bytes in each partition (and thus may have a total size of p×b bytes). State buffer regions SB1, SB2, SB3, and the like may be at a same region of the state buffer or may be at different regions of the state buffer. In some embodiments, two or more of state buffer regions SB1, SB2, SB3, and the like may be at a same region of the state buffer. Each state buffer region SBn of state buffer regions SB1, SB2, SB3, and the like may be allocated to store the tensor at a first time $t_{n1}$ and may be deallocated for the tensor at a second time $t_{n2}$, and thus the tensor may be alive in state buffer region SBn between the first time $t_{n1}$ and the second time $t_{n2}$.

In one example shown by a process 802, the compiled instruction code may include an instruction load[0] (e.g., a DMA load instruction) for loading the tensor into region SB1 of the state buffer, or an instruction allocate [0] for allocating region SB1 of the state buffer to the tensor (e.g., a tensor operation that writes an output tensor to region SB1 of the state buffer) at or before time $t_{11}$. In some embodiments, the compiled instruction code may also include an optional instruction save[0] (e.g., a DMA save instruction) to save the tensor to a DRAM at around time $t_{12}$ (e.g., if the tensor is modified or created in region SB1 after time $t_{11}$) so that region SB1 may be used to store other data. The tensor may be reloaded from the DRAM into the state buffer later for tensor operations and may optionally be saved to the DRAM after the use if the tensor has been modified. For example, the compiled instruction code may include an instruction load[1] (e.g., a DMA load instruction) to reload the tensor from the DRAM into region SB2 of the state buffer at around time $t_{21}$, an optional instruction save[1] (e.g., a DMA save instruction) to save the tensor to the DRAM at around time $t_{22}$, an instruction load[2] (e.g., a DMA load instruction) to reload the tensor from the DRAM into region SB3 of the state buffer at around time $t_{31}$, an optional instruction save[2] (e.g., a DMA save instruction) to save the tensor to the DRAM at around time $t_{32}$, and so on. In this example, because the instruction code includes multiple DMA instructions, the latency and the execution time of executing the instruction code may be long.

In one example according to an embodiment shown by a process 804, the compiler may analyze the instruction code used in process 802, and may determine that, between time $t_{22}$ and time $t_{31}$, a region of the state buffer that may or may not have the same dimensions as the tensor but may have a total size equal to or greater than the size of the tensor is not used. As such, the compiler may replace instruction save[1] (e.g., a DMA save instruction) with a tensor copy instruction 820 or may insert a tensor copy instruction 820 at around time $t_{22}$ to read the tensor from region SB2, reshape the tensor if needed to fit in the unused region, and store the (reshaped) tensor in the unused region of the state buffer. The compiler may also replace instruction load[2] (e.g., a DMA load instruction) with a tensor copy instruction 822 to read the (reshaped) tensor from the unused region, reshape it back to the original shape (e.g., having the original dimensions) of the tensor (or based on the dimensions of region SB3) if needed, and store the tensor in the original shape to region SB3 of the state buffer. In this way, the number of DMA operations that may have a long latency and a lower bandwidth may be reduced. As described above, the tensor copy instructions may be performed by a processing engine that is on a same chip or in a same package as the local memory and is connected to the local memory through a dedicate parallel bus, and thus can be performed with a low latency and a higher bandwidth. As such, the instruction code compiled by the compiler may be performed by a computing system with a low latency and a higher bandwidth.

In another example according to an embodiment shown by a process 806, the compiler may analyze the instruction code used in process 802, and may determine that, between time $t_{12}$ and time $t_{21}$, a region of the state buffer that may or may not have the same dimensions as the tensor but may have a total size equal to or greater than the size of the tensor is not used. As such, the compiler may replace instruction save[0] (e.g., a DMA save instruction) with a tensor copy instruction 830 or may insert a tensor copy instruction 830 at around time $t_{12}$ to read the tensor from region SB1, reshape the tensor if needed to fit in the unused region, and store the (reshaped) tensor in the unused region of the state buffer. The compiler may also replace instruction load[1] (e.g., a DMA load instruction) with a tensor copy instruction 832 to read the (reshaped) tensor from the unused region, reshape it back to the original shape (e.g., having the original dimensions) of the tensor (or based on the dimensions of region SB2) if needed, and store the tensor in the original shape to region SB2 of the state buffer. In this way, the number of DMA operations that may have a long latency and a lower bandwidth may be reduced, and thus the instruction code may be performed by a computing system with a low latency and a higher bandwidth.

In yet another example according to an embodiment shown by a process 808, the compiler may analyze the instruction code used in process 802, and may determine that, between time $t_{12}$ and time $t_{31}$, a region of the state buffer that may or may not have the same dimensions as the tensor but may have a total size equal to or greater than the size of the tensor is unused. As such, the compiler may replace instruction save[0] (e.g., a DMA save instruction) with a tensor copy instruction 840 or may insert a tensor copy instruction 840 at around time $t_{12}$ to read the tensor from region SB1, reshape the tensor if needed to fit in the unused region, and store the (reshaped) tensor in the unused region of the state buffer. The compiler may replace instruction load[1] (e.g., a DMA load instruction) with a tensor copy instruction 842 to read the (reshaped) tensor from the unused region, reshape it back to the original shape (e.g., having the original dimensions) of the tensor (or based on the dimensions of region SB2) if needed, and store the tensor in the original shape to region SB2 of the state buffer. Instruction save[1] may not be needed or may not need to be replaced with a tensor copy instruction since the (reshaped) tensor is saved in the unused region by tensor copy instruction 840. In embodiments where the tensor is changed in region SB2, a tensor copy instruction may be used to save the changed tensor to the unused region. The compiler may also replace instruction load[2] (e.g., a DMA load instruction) with a tensor copy instruction 844 to read the (reshaped) tensor from the unused region, reshape it back to the original shape (e.g., having the original dimensions) of the tensor (or based on the dimensions of region SB3) if needed, and store the tensor in the original shape to region SB3 of the state buffer. In this way, the number of DMA operations that may have a long latency and a lower bandwidth may be reduced, and thus the instruction code may be performed with a low latency and a higher bandwidth.

In another example according to an embodiment shown by a process 810, the compiler may analyze the instruction code used in process 802, and may determine that, between time $t_{12}$ and time $t_{21}$, a first unused region of the state buffer that may or may not have the same dimensions as the tensor may have a total size equal to or greater than the size of the tensor. The compiler may also determine that, between time $t_{22}$ and time $t_{31}$, a second unused region of the state buffer that may or may not have the same dimensions as the tensor may have a total size equal to or greater than the size of the tensor. The compiler may replace instruction save[0] (e.g., a DMA save instruction) with a tensor copy instruction 850 or may insert a tensor copy instruction 850 at around time $t_{22}$ to read the tensor from region SB1, reshape the tensor if needed to fit in the unused region, and store the (reshaped) tensor in the first unused region of the state buffer. The compiler may also replace instruction load[1] (e.g., a DMA load instruction) with a tensor copy instruction 852 to read the (reshaped) tensor from the unused region, reshape it to the original shape (e.g., having the original dimensions) of the tensor (or based on the dimensions of region SB2) if needed, and store the tensor in the original shape to region SB2 of the state buffer. The compiler may also replace instruction save[1] (e.g., a DMA save instruction) with a tensor copy instruction 854 or insert a tensor copy instruction 854 at around time $t_{22}$ to read the tensor from region SB2, reshape the tensor if needed to fit in the unused region, and store the (reshaped) tensor in the unused region of the state buffer. The compiler may further replace instruction load[2] (e.g., a DMA load instruction) with a tensor copy instruction 856 to read the (reshaped) tensor from the unused region, reshape it to the original shape (e.g., having the original dimensions) of the tensor (or based on the dimensions of region SB3) if needed, and store the tensor in the original shape to region SB3 of the state buffer. In this way, the number of DMA operations that may have a long latency and a lower bandwidth may be reduced.

As described above, the tensor copy instructions may be performed by a processing engine that is on a same chip or in a same package as the local memory and is connected to the local memory through a dedicate parallel bus, and thus may be performed with a low latency and a higher bandwidth. As such, the instruction code compiled by the compiler may be performed with a low latency and a higher bandwidth. In some embodiments, the tensor may continue to reside in a state buffer region after the state buffer region is deallocated for the tensor or after the last use of the tensor in the state buffer region, for example, if the state buffer region is not immediately assigned to another tensor. Therefore, the tensor copy instruction to save the tensor from the state buffer region to the unused state buffer region may be performed at a time after the deallocation of the state buffer region. In some embodiments, a state buffer region may be evacuated or unused before it is allocated to a tensor, and thus the tensor copy instruction that reads the reshaped tensor and reshapes it and saves it to allocated state buffer region may be performed before the state buffer region is allocated to the tensor. Therefore, the state buffer region for storing the reshaped tensor may only need to be unused by other operations in a time period that is after the deallocation of a state buffer region for the tensor and before the next allocation of a state buffer region for the tensor.

FIG. 9 includes a flowchart 900 illustrating an example of a method of using tensor copy instructions to reduce DMA operations for state buffer spilling and reloading according to certain embodiments. Operations described in flowchart 900 may be performed by, for example, a compiler running on a host system, such as the compiler and host system described above with respect to FIG. 4 and/or FIG. 6. Although flowchart 900 may describe the operations as a sequential process, in various embodiments, some of the operations may be performed in parallel or concurrently. In addition, the order of the operations may be rearranged. The process may have additional operations not shown in the figure. Each block in flowchart 900 may include one or more operations. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium or may be carried by one or more data carrying signals.

At block 910, a computing system implementing a neural network compiler, such as host system 400, may identify groups of DMA load instructions in the compiled instruction code to be executed by a computing system to implement a neural network model. DMA load instructions in each group of DMA load instructions may read from a same DRAM location in a DRAM of the computing system to load or reload a same tensor (or tensors modified from a same base tensor) from the DRAM device into a local memory of the computing system for implementing the neural network model. The destinations of the group of DMA load instruction may be a same region in the local memory or may be different regions in the local memory. An example of a group of DMA load instructions that load a same tensor from a same location of a DRAM to a local memory of the computing system is shown in process 802 of FIG. 8 as described above. In some embodiments, the first DMA load instruction in a group of DMA load instructions may be replaced by another instruction that allocates a region of the local memory to the tensor, such as a tensor operation instruction (e.g., a matrix multiplication instruction) for generating the tensor and save the tensor to the region of the local memory.

At block 920, for each group of DMA load instructions identified in block 910, the computing system may start a loop by setting a variable prev to 0 and setting a variable current to 1, and repeatedly perform operations at blocks 922 to 932 to identify opportunities for reducing DMA operations for tensor spilling and reloading. At block 922, instructions load[prev] and load [current] in the group of DMA load instructions may be selected. Instruction load[prev] may load a tensor from a location of a DRAM to region SB1 in the local memory, and instruction load [current] may load the tensor from the location of the DRAM to region SB2 in the local memory. The tensor, region SB1, and region SB2 may each have a size of p partitions×b bytes per partition. The tensor may be alive in region SB1 between time $t_1$ and time $t_2$, and may be alive in SB2 between time $t_3$ and time $t_4$. For example, region SB1 may be allocated to the tensor at time $t_1$ and may be deallocated for the tensor at time $t_2$.

At block 924, the computing system may determine candidate regions {x[j] j=0, 1, 2, 3, 4, . . . , m} in the local memory that are not used by other instructions in a time interval $[t_2, t_3]$ and each have a size of $p_j$ partitions×$b_j$ bytes per partition that is equal to or greater than the size of the tensor (e.g., p partitions×b bytes per partition). As described above, in some embodiments, the tensor may stay alive in region SB1 until time $t_5$ after the deallocation of region SB1 to the tensor or the last use of the tensor in SB1 at time $t_2$, and region SB2 may be evacuated and available for storing the tensor at time $t_6$ before region SB2 is allocated to the tensor at time $t_3$. Therefore, the candidate regions {x[j] j=0, 1, 2, 3, 4, m} in the local memory may only need to be available for storing the tensor (or a reshaped tensor) in a time interval $[t_5, t_6]$, where $t_5>t_2$ and $T6<t_3$. In some cases, there may be no candidate regions available in time interval $[t_2, t_3]$ or $[t_5, t_6]$.

At block 925, the computing system may determine if at least one candidate region has been identified at block 924. If no candidate region is identified, the current pair of instructions load[prev] and load[current] may not be reduced, and the computing system may set prev=current and current=current+1 at block 930 and perform operations of blocks 922, 924, and 925 for the next pair of DMA load instructions. One example of performing operations of blocks 922, 924, 925, and 930 is shown in process 804 of FIG. 8, where there may not be a candidate region that is unused between instructions save[0] and load[1] (e.g., between time $t_{12}$ and time $t_{21}$) and has a size equal to or greater than the size of the tensor, and thus both load[0] and load[1] (and save[0]) may need to be performed and the computing system may move on to evaluate the pair of instructions load[1] and load[2].

If the computing system determines at block 925 that m (≥1) candidate regions are identified at block 924, the computing system may, at block 926, select the candidate region with the smallest size (e.g., a region SB1.5) from them candidate regions (in order to minimize fragmentation in the local memory), insert a tensor copy instruction to reshape the tensor in region SB1 according to the dimensions of the selected region (e.g., region SB1.5) and save the reshaped tensor to the selected region at time $t_2$ or time $t_5$. The computing system may insert another tensor copy instruction to reshape the tensor at the selected region back to its original dimensions and save the tensor in its original dimensions to region SB2 at time $t_3$ (or $t_6$), and remove instruction load[current]. One example of performing operations of blocks 922, 924, 925, and 926 is shown in process 806 of FIG. 8, where there may be at least one candidate region that is unused between instructions save[0] and load[1] (e.g., between time $t_{12}$ and time $t_{21}$) and has a size equal to or greater than the size of the tensor, and thus load[1] may be removed and tensor copy instructions 830 and 832 may be added to the instruction code.

After performing the instruction modification at block 926, the computing system may determine, at block 927, whether variable current is greater than prev+1. If variable current is not greater than prev+1, for example, current=prev+1, the computing system may increase current by 1 and keep the prev value at block 932. If the computing system determines at block 927 that variable current is greater than prev+1, the computing system may remove previously inserted tensor copy instructions for load instructions between instruction load[prev] and instruction load[current] at block 928, and increase variable current by 1 at block 932 to select another pair of DMA load instructions in the group of DMA load instruction.

For example, in the example shown by process 808, after performing operations at blocks 922, 924, 925, and 926 for the pair of instructions load [0] and load[1], current=1 and prev=0, and the computing system may perform operations at blocks 927 and 932, such that prev=0, and current=2. Therefore, the computing system may select the pair of instruction load[0] and load[2] at block 922 and then perform operations of blocks 924 and 925. In the example shown by process 808, there may be at least one candidate region that is unused between about time $t_{12}$ and about time $t_{31}$ and has a size equal to or larger than the size of the tensor, and thus instructions load[1] and load[2] may not need to be performed. The computing system may, at block 926, select a candidate region, insert a tensor copy instruction 840 to reshape the tensor based on the dimensions of the selected candidate region and save the reshaped tensor to the selected candidate region at about time $t_{12}$, insert a tensor copy instruction 844 to reshape the tensor at the selected candidate region back to the original tensor and save the original tensor to region SB3 at about time $t_{31}$, and remove instruction load[2] (e.g., replacing instruction load[2] with tensor copy instruction 844). In the example shown in process 808, the computing system may determine at block 927 that variable current is greater than prev+1 (because prev=0 and current=2), and thus may move to block 928. At block 928, previously inserted tensor copy instructions for instruction load[1] (between instruction load[0] and instruction load [2]), such as tensor copy instructions 830 and 832 inserted in process 806, may be removed since the candidate region selected in process 808 may be different from the candidate region selected in process 806 and the tensor is saved in an unused region in the local memory by tensor copy instruction 840. In addition, a tensor copy instruction 842 may need to be inserted to reshape the tensor stored in the selected candidate region back to the original shape and save it to region SB2 at about time $t_{21}$ because of the change of the selected candidate region for storing the reshaped tensor. After performing the operations at block 928, the computing system may increase variable current by 1 (e.g., current=2+1=3) and keep the value of variable prev at 0 to select the next pair of instructions load[0] and load[3].

Operations at blocks 922 to 932 may be repeatedly performed for each pair of DMA load instructions in a group. After a group of DMA load instructions has been analyzed and reduced, another group of DMA load instructions identified at block 910 may be analyzed and reduced similarly, until all groups of DMA load instructions are analyzed and reduced.

Figure 10:
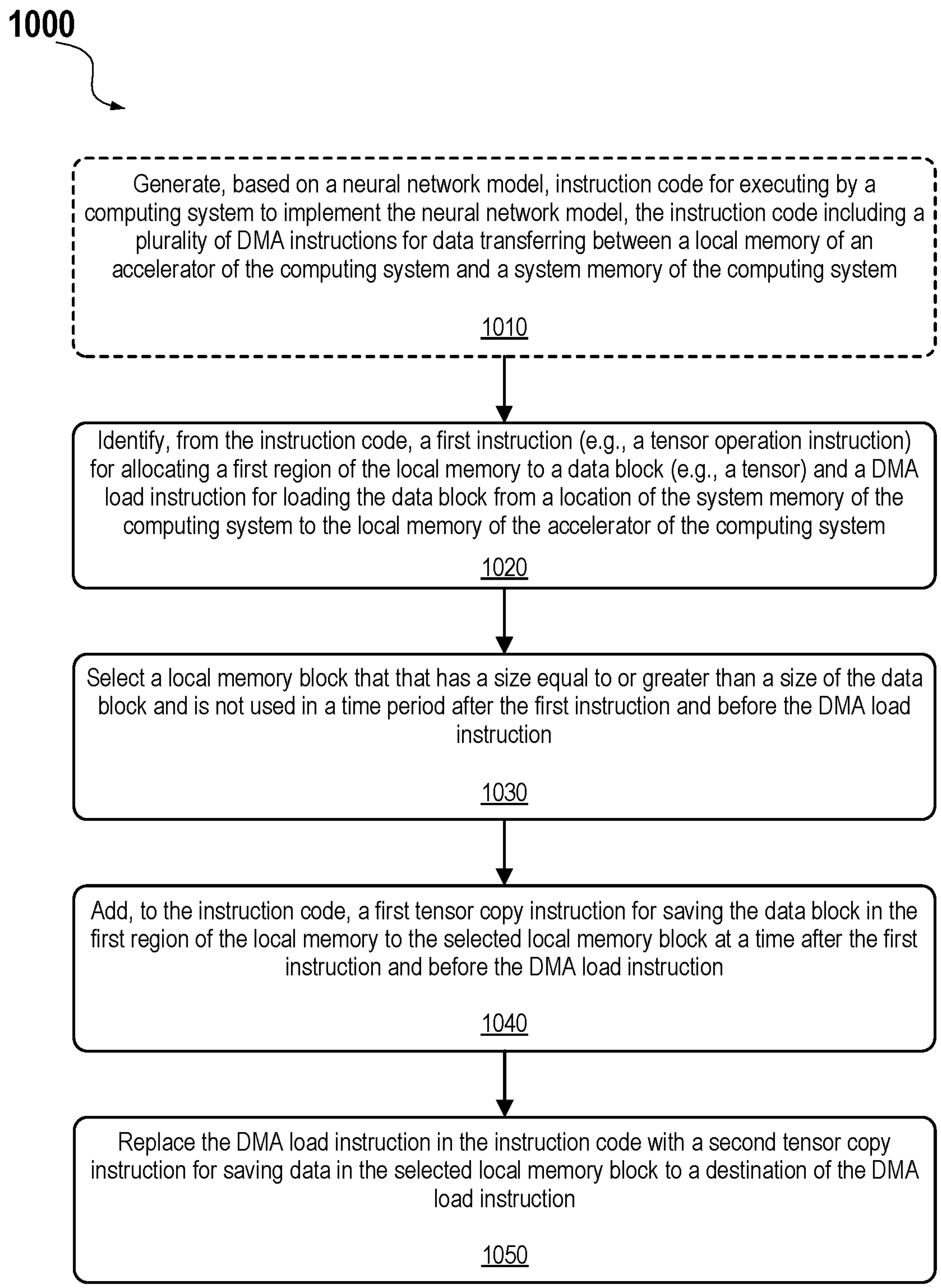
FIG. 10 illustrates an example of a method of using tensor copy instructions to reduce DMA operations according to certain embodiments.

FIG. 10 includes a flowchart 1000 illustrating an example of a method using tensor copy instructions to reduce DMA operations for state buffer spilling and reloading according to certain embodiments. Operations described in flowchart 1000 may be performed by, for example, a compiler running on a host system, such as the compiler and host system described above with respect to FIG. 4 and/or FIG. 6. Although flowchart 1000 may describe the operations as a sequential process, in various embodiments, many of the operations may be performed in parallel or concurrently. In addition, the order of the operations may be rearranged. The process may have additional operations not shown in the figure. Each block in flowchart 1000 may include one or more operations. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium or may be carried by one or more data carrying signals.

At block 1010, a host system (e.g., host system 400) implementing a neural network compiler may optionally generate, based on a neural network model and configuration of a computing system (e.g., computing system 500), instruction code for execution by the computing system to implement the neural network model. The instruction code may include a plurality of DMA instructions for data transferring between a local memory (e.g., state buffer) of an accelerator and a system memory (e.g., a DRAM) of the computing system. The neural network model may include, for example, a CNN, such as a ResNet, or other neural network models, and may be described using, for example, a high-level programming language, such as Java, C++, MATLAB, Python, Tensorflow, or a computation graph, among many other examples. The neural network model may include a single batch model, or a batch-N model (N>1). As described above with respect to, for example, FIGS. 4 and 6, the host system may implement the neural network compiler in multiple stages or phases. For example, the instruction code may be generated by front end 610, middle end 620, and back end 630 (except DMA reduction block 634).

A local memory (e.g., a state buffer 504-1) of a processing engine (e.g., an accelerator 502-1) of the computing system may have a finite size, such as about a few megabytes, and thus may not be able to store all data used by the neural network. Therefore, the generated instruction code may include a plurality of DMA instructions for data transferring between the local memory of the processing engine and the system memory (e.g., system memory 520) of the computing system. The data transferred between the local memory and the system memory may include, for example, input tensors to be processed, static variables such as weights of the neural network (e.g., filters of a CNN), and output tensors generated using the input tensors and the static variables. For example, static variables may be loaded into the local memory, used by one or more computation operations, evicted from the local memory after the one or more computation operations, and reloaded to the local memory for other computation operations in later stages. Output tensors of some tensor operations may be used as the input tensors for some other tensor operations (e.g., on the subsequent layers), and thus may also need to be saved in the system memory and then reloaded into the system memory when needed. The instruction code may also include computation instructions, such as convolution operations (e.g., matrix multiplications), activation operations, pooling operations, residue add operations, and the like as described above. The computation instructions may use the input tensors and the static variables loaded into the local memory, and may save intermediate output tensors to the local memory.

At block 1020, the host system may identify, from the instruction code for execution by the computing system to implement the neural network model, a first instruction for allocating a first region of the local memory (e.g., a state buffer) of the accelerator of the computing system to a data block (e.g., a tensor) and a first DMA load instruction for loading the data block from a location of the system memory (e.g., a DRAM) of the computing system to the local memory of the accelerator of the computing system. The first instruction may be a tensor operation instruction that generates the data block, or may be a second DMA load instruction that loads the data block from the location of the system memory to the first region of the local memory. The first DMA load instruction may be used to load the tensor from the location of the system memory to a second region of the local memory (i.e., the destination of the second DMA load instruction), where the first region and the second region may be a same region or different regions in the local memory and may have the same dimensions or different dimensions but the same size. As described above, in some embodiments, the host system may identify groups of the DMA load instructions that load a same tensor to the local memory.

At block 1030, the host system may select a local memory block that has a size equal to or greater than a size of the data block (e.g., a tensor) in the first region of the local memory and is not used in a time period after the first instruction and before the first DMA load instruction. For example, the time period may start at a time after the deallocation of the first region of the local memory for the tensor or the last use of the tensor in the first region of the local memory (e.g., $t_2$ or $t_5$ described above with respect to FIG. 9). The time period may end at a time before or at the allocation of the second region of the local memory to the tensor (e.g., $t_3$ or $t_6$ described above with respect to FIG. 9). The local memory block may have a shape different from the shape of the tensor, the first region, or the second region of the local memory. For example, the local memory block may have fewer partitions or fewer bytes in each partition than the first region or the second region of the local memory. However, the total size of the local memory block (number of partitions times the number of bytes per partition) may be equal to or greater than the size of the tensor. In some embodiments, the host system may determine the local memory block by identifying a plurality of regions of the local memory that each have a size equal to or greater than the size of the data block to be loaded by the first DMA load instruction and are not used in the time period after the first instruction and before the first DMA load instruction, and selecting a region that has the smallest size among the plurality of regions of the local memory as the local memory block for saving the data block in the first region of the local memory.

At block 1040, the host system may add, to the instruction code, a first tensor copy instruction for saving the data block in the first region of the local memory to the selected local memory block at a time after the first instruction and before the first DMA load instruction. As described above, in some embodiments, the first tensor copy instruction may be executed after the last use of the tensor in the first region of the local memory or after the deallocation of the first region for the tensor, to read the tensor from the first region of the local memory, reshape the tensor if needed based on dimensions of the local memory block selected at block 1030, and save the reshaped tensor to the selected local memory block. The first tensor copy instruction may maintain a total size of the data block but may change dimensions of the data block. In embodiments where the selected local memory block can fit the original tensor, reshaping of the original tensor may not be performed by the first tensor copy instruction. The first tensor copy instruction may be scheduled to be performed by a processing engine (e.g., a pooling engine) of the accelerator, where the processing engine may be connected to the local memory of the accelerator through a dedicated bus interface. The dedicated bus interface may be configured to parallelly read from or write to a plurality of partitions of the local memory. The processing engine and the local memory may be on a same semiconductor chip or in a same integrated circuit package.

At block 1050, the host system may replace the first DMA load instruction in the instruction code with a second tensor copy instruction for saving data in the selected local memory block to a destination of the first DMA load instruction. For example, the second tensor copy instruction may be executed to read the reshaped tensor from the selected local memory block, change the reshaped tensor to the tensor in its original dimensions or in different dimensions matching the second region of the state buffer, and save the tensor to the second region of state buffer. The second tensor copy instruction may maintain a total size of the data block but may change dimensions of the data block. The second tensor copy instruction may be scheduled to be performed by the processing engine (e.g., a pooling engine) of the accelerator that is connected to the local memory of the accelerator through a dedicated bus interface and may be on a same semiconductor chip or in a same integrated circuit package with the local memory.

In some embodiments, the host system may determine, from the instruction code, a second DMA load instruction for loading the data block from the location of the system memory to the local memory, where the second DMA load instruction is before or after the first DMA load instruction. The host system may then replace the second DMA load instruction in the instruction code with a third tensor copy instruction for writing the content of the selected local memory block to a destination of the second DMA load instruction. In some embodiments, the host system may identify, from the instruction code, a DMA save instruction before the first DMA load instruction and used for saving data from the local memory to the location of the system memory, where adding the first tensor copy instruction may include replacing the DMA save instruction with the first tensor copy instruction.

Figure 11:
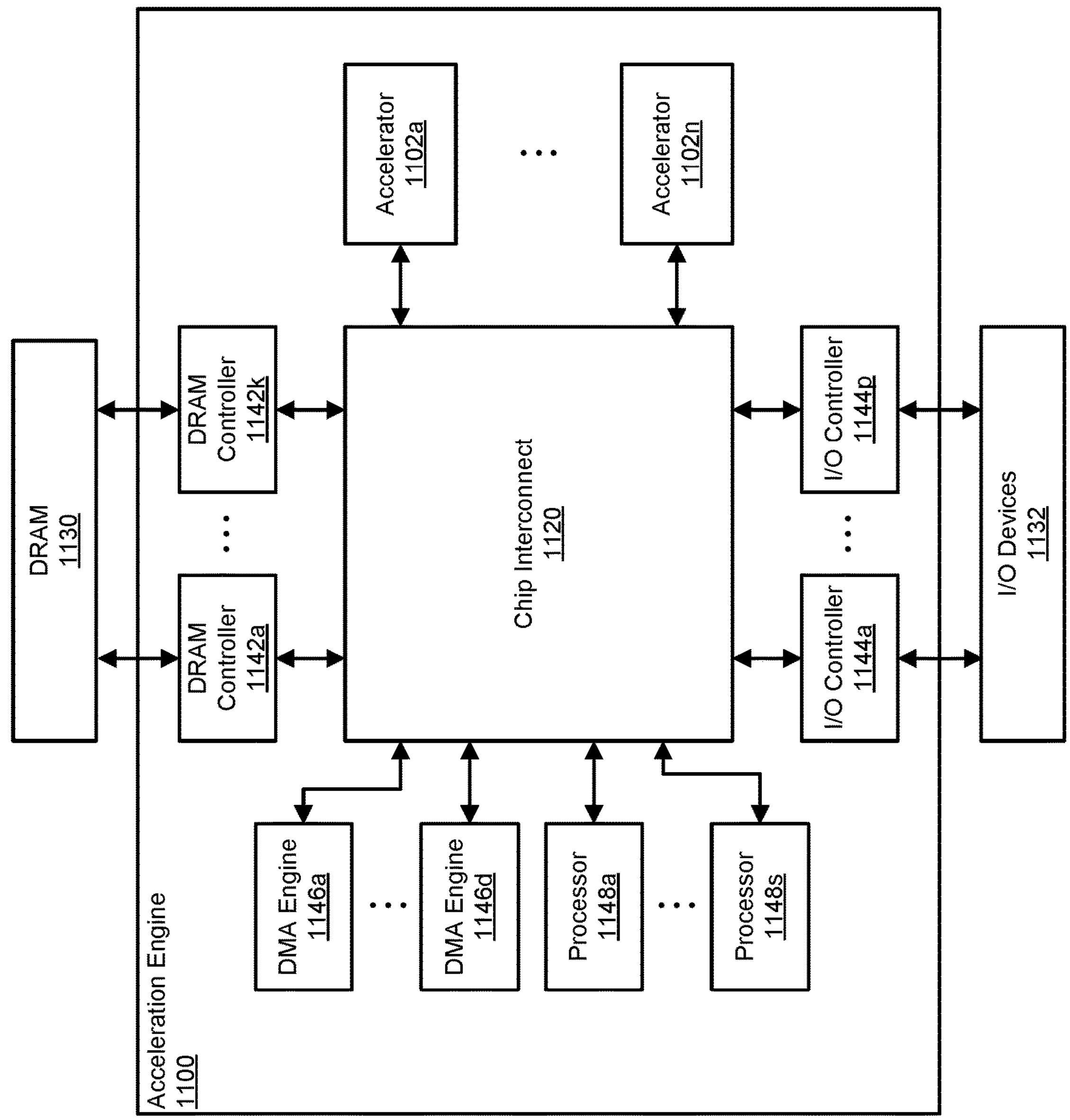
FIG. 11 includes a block diagram of an example of an acceleration engine.

FIG. 11 includes a block diagram that illustrates an example of an acceleration engine 1100. The acceleration engine 1100 is an example of an integrated circuit that can include one or more accelerators 1102*a*-1102*n* that may be similar to the accelerator illustrated in FIG. 3.

In the example of FIG. 11, the acceleration engine 1100 includes multiple accelerators 1102*a*-1102*n*, each of which can perform a set of operations. In various examples, the accelerators 1102*a*-1102*n* are for particular types of operations, so that the accelerators 1102*a*-1102*n* can perform the operations much faster than when similar operations are performed by a general purpose processor. In various examples, to perform a set of operations, input data on which the operations are to be performed must first be moved into the accelerators 1102*a*-1102*n*. Additionally, in some cases, program code is also moved into the accelerators 1102*a*-1102*n*, which programs the operations that the accelerators 1102*a*-1102*n* will perform on the data. In the illustrated example, the acceleration engine 1100 includes n accelerators 1102*a*-1102*n*. Examples of accelerators that can be included in the acceleration engine 1100 include graphics accelerators, floating point accelerators, neural network accelerators, and others. In various examples, the accelerators 1102*a*-1102*n* can each be the same (e.g., each of the accelerators 1102*a*-1102*n* is a graphics accelerator) or can be different (e.g., the accelerators 1102*a*-1102*n* include a graphics accelerator, a floating point accelerator, and neural network accelerator).

The example acceleration engine 1100 further includes DRAM controllers 1142*a*-1142*k* for communicating with an external memory. The external memory is implemented, in this example, using DRAM 1130. In the illustrated example, the acceleration engine 1100 includes k DRAM controllers 1142*a*-1142*k*, each of which may be able to communicate with an independent set of banks of DRAM. In other examples, other types of RAM technology can be used for the external memory. The DRAM controllers 1142*a*-1142*k* can also be referred to as memory controllers.

In various examples, input data and/or program code for the accelerators 1102*a*-1102*n* can be stored in the DRAM 1130. Different programs can cause the accelerators 1102*a*-1102*n* to perform different operations. For example, when one of the accelerators is a neural network accelerator, one program can configure the neural network accelerator to perform speech recognition while another program can configure the neural network accelerator to perform image recognition. In various examples, different accelerators 1102*a*-1102*n* can be programmed with different programs, so that each performs a different set of operations. In various examples, the processors 1148*a*-1148*s* can manage moving of program code from the DRAM 1130 to the accelerators 1102*a*-1102*n*.

The example acceleration engine 1100 further includes I/O controllers 1144*a*-1144*p* for communicating with I/O devices 1132 in the system. The acceleration engine 1100 can communicate with I/O devices over, for example, a processor bus. In some examples, the processor bus can be implemented using Peripheral Component Interconnect (PCI) and/or a variation of the PCI bus protocol. The processor bus can connect the acceleration engine 1100 to I/O devices such as, for example, input and output devices, memory controllers, storage devices, and/or network interface cards, among other things. In some examples, the I/O controllers 1144-1144*p* can enable the acceleration engine 1100 to act as an I/O device for a host processor. For example, the acceleration engine 1100 can be the recipient of input data from the host processor, and a command indicating an operation to be performed on the input data (e.g., a particular computation or analysis). In the illustrated example, the acceleration engine 1100 includes p I/O controllers 1144*a*-1144*p*, each of which may include a separate root complex and may communicate with a separate set of I/O devices 1132. In other examples, other standardized bus protocols, such as Ultra Path Interconnect (UPI) can be used for the host bus. In other examples, a proprietary bus protocol can be used.

Movement of data in the acceleration engine 1100 can be managed by one or more processors 1148*a*-1148*s*, which can also be referred to as data management processors. In the example of FIG. 11, the acceleration engine 1100 includes s processors 1148*a*-1148*s* incorporated into the device (e.g., on the same silicon die). In other examples, the processors 1148*a*-1148*s* can be external to the acceleration engine 1100 (e.g., on a different die and/or in a different package). In some examples, the processors 1148*a*-1148*s* can manage the movement of data from I/O devices 1132 to the accelerators 1102*a*-1102*n* or the DRAM 1130. For example, input data may be located at an I/O device 1132 or in processor memory, and the processors 1148*a*-1148*s* can move the input from the I/O device 1132 or processor memory into an accelerator or into DRAM 1130. As another example, program code for the accelerators 1102*a*-1102*n* may be located on an I/O device 1132 or in processor memory.

The example acceleration engine 1100 further includes DMA engines 1146*a*-1146*d* that can move data between the accelerators 1102*a*-1102*n*, DRAM controllers 1142*a*-1142*k*, and I/O controllers 1144*a*-1144*p*. In the illustrated example, the acceleration engine 1100 includes d DMA engines 1146*a*-1146*d*. In some implementations, the DMA engines 1146*a*-1146*d* can be assigned to specific tasks, such as moving data from the DRAM controllers 1142*a*-1142*d* to the accelerators 1102*a*-1102*n*, or moving data between the I/O controllers 1144*a*-1144*p* and the accelerators 1102*a*-1102*n*. These tasks can be assigned, for example, by enqueueing descriptors with the DMA engines 1146*a*-1146*d*, where a descriptor identifies an address for a block of data and an operation (e.g., a read or a write) to perform. A descriptor, for example, can direct a DMA engine to instruct a DMA controller to read a block of data from DRAM 1130. A descriptor can, as a further example, instruct the DMA engine to write data, read by the DMA controller, to an accelerator. Further descriptors can be used to move data from an accelerator to DRAM 1130.

In various examples, each of the processors 1148*a*-1148*s* can be responsible for managing the data movement for a different accelerator. In some examples, a processor may manage the data movement for more than one accelerator. Similarly, in various examples, each of the processors 1148*a*-1148*s* can be assigned to one or more DMA engines 1146*a*-1146*d*. In these and other examples, associations between processors 1148*a*-1148*s*, accelerators 1102*a*-1102*n*, and DMA engines 1146$a$-1146$d$ are determined by program code being executed by each respective processor.

In the example acceleration engine 1100, the various components can communicate over a chip interconnect 1120. The chip interconnect 1120 primarily includes wiring for routing data between the components of the acceleration engine 1100. In some cases, the chip interconnect 1120 can include a minimal amount of logic, such as multiplexors to control the direction of data, flip-flops for handling clock domain crossings, and timing logic.

Figure 12:
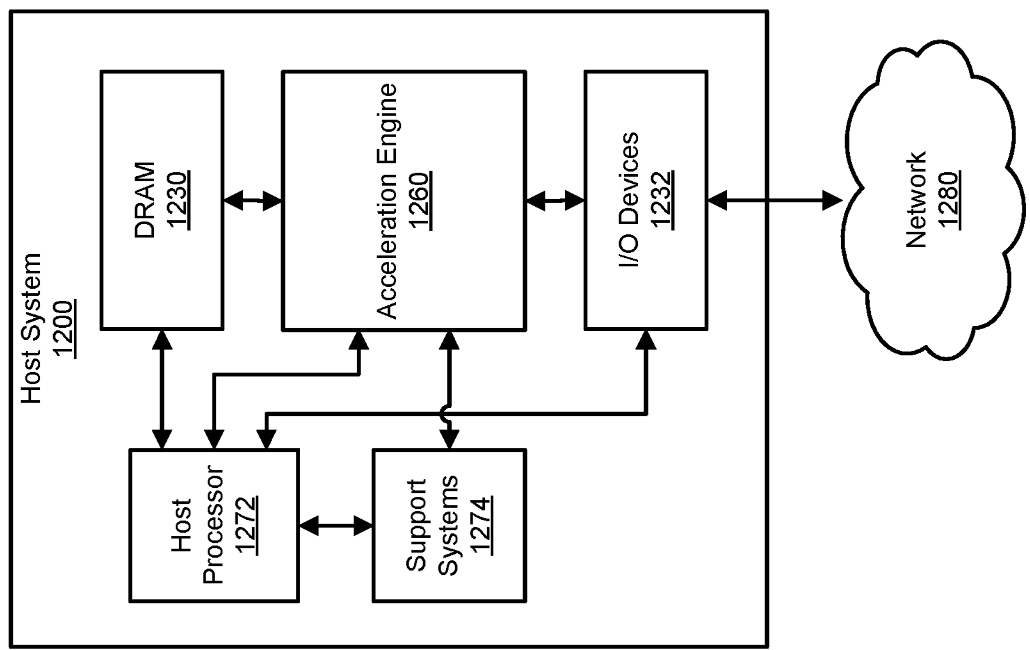
FIG. 12 includes a block diagram of an example of a host system.

FIG. 12 includes a block diagram that illustrates an example of a host system 1200 in which an acceleration engine 1260 can be used. The acceleration engine 1260 of FIG. 12 is an example of a device that can include one or more accelerators such as is illustrated in FIG. 11. The example host system 1200 of FIG. 12 includes the acceleration engine 1260, a host processor 1272, DRAM 1230 or processor memory, I/O devices 1232, and support systems 1274. In various implementations, the host system 1200 can include other hardware that is not illustrated here.

The host processor 1272 is a general purpose integrated circuit that is capable of executing program instructions. In some examples, the host processor 1272 can include multiple processing cores. A multi-core processor may include multiple processing units within the same processor. In some examples, the host system 1200 can include more than one host processor 1272. In some examples, the host processor 1272 and the acceleration engine 1260 can be one chip, such as, one or more integrated circuits within the same package.

In various examples, the host processor 1272 can communicate with other components in the host system 1200 over one or more communication channels. For example, the host system 1200 can include a host processor bus, which the host processor 1272 can use to communicate with the DRAM 1230, for example. As another example, the host system 1200 can include an I/O bus, such as a PCI-based bus, over which the host processor 1272 can communicate with the acceleration engine 1260 and/or the I/O devices 1232, for example. In various examples, the host system 1200 can, alternatively or additionally, include other communication channels or busses, such as serial busses, power management busses, storage device busses, and so on.

In some examples, software programs executing on the host processor 1272 can receive or generate input for processing by the acceleration engine 1260. In some examples, the programs can select an appropriate neural network to execute for a given input. For example, a program may be for language translation, and can select one or more neural networks capable of speech recognition and/or machine translation. In these and other examples, the programs can configure the acceleration engine 1260 with the neural network to execute, and/or can select a neural network processing engine on the acceleration engine 1260 that has previously been configured to execute the desired neural network. In some examples, once the acceleration engine 1260 has started an inference on input data, the host processor 1272 can manage the movement of data (such as weights, instructions, intermediate results, results of conditional layers, and/or final results) into or out of the acceleration engine 1260.

In some examples, a software program that is using the acceleration engine 1260 to conduct an inference can read the result from a conditional layer from the acceleration engine 1260 and/or from a storage location, such as in DRAM 1230. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1230 is memory that is used by the host processor 1272 for storage of program code that the host processor 1272 is in the process of executing, as well as values that are being operated on. In some examples, the data for a neural network (e.g., weight values, instructions, and other data) can be all or partially stored in the DRAM 1230. DRAM is a common term for processor memory, and though DRAM is volatile memory, processor memory can be volatile and/or non-volatile. Though not illustrated here, the host system 1200 can include other volatile and non-volatile memories for other purposes. For example, the host system 1200 can include a Read-Only Memory (ROM) that stores boot code for booting the host system 1200 at power on, and/or Basic Input/Output System (BIOS) code.

Though not illustrated here, the DRAM 1230 can store instructions for various programs, which can be loaded into and be executed by the host processor 1272. For example, the DRAM 1230 can be storing instructions for an operating system, one or more data stores, one or more application programs, one or more drivers, and/or services for implementing the features disclosed herein.

The operating system can manage and orchestrate the overall operation of the host system 1200, such as scheduling tasks, executing applications, and/or controller peripheral devices, among other operations. In some examples, a host system 1200 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1200. For example, some drivers can provide communication between the operating system and peripheral devices or I/O devices 1232. Alternatively or additionally, some drivers may provide communication between application programs and the operating system, and/or application programs and peripheral devices accessible to the host system 1200. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1232 can include hardware for connecting to user input and output devices, such as keyboards, mice, pens, tablets, voice input devices, touch input devices, displays or monitors, speakers, and printers, among other devices. The I/O devices 1232 can also include storage drives and/or network interfaces for connecting to a network 1280. For example, the host system 1200 can use a network interface to communicate with storage devices, user terminals, other computing devices or servers, and/or other networks, among various examples.

In various examples, one or more of the I/O devices 1232 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1200 or may be in an external enclosure. A storage device can be fixed (e.g., attached by screws) or removable (e.g., having a physical release mechanism and possibly a hot-plug mechanism).

Storage devices, the DRAM 1230, and any other memory component in the host system 1200 are examples of computer-readable storage media. Computer-readable storage media are physical mediums that are capable of storing data in a format that can be read by a device such as the host processor 1272. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1232 can be PCI-based devices. In these examples, a PCI-based I/O device includes a PCI interface for communicating with the host system 1200. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1274 can include hardware for coordinating the operations of the acceleration engine 1260. For example, the support systems 1274 can include a microprocessor that coordinates the activities of the acceleration engine 1260, including moving data around on the acceleration engine 1260. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1272. In some examples, the program executed by the microprocessor is stored on the hardware of microprocessor, or on a non-volatile memory chip in the host system 1200. In some examples, the microprocessor and the acceleration engine 1260 can be on chip, such as one integrated circuit on the same die and in the same package.

In some examples, the support systems 1274 can be responsible for taking instructions from the host processor 1272 when programs executing on the host processor 1272 request the execution of a neural network. For example, the host processor 1272 can provide the support systems 1274 with a set of input data and a task that is to be performed on the set of input data. In this example, the support systems 1274 can identify a neural network that can perform the task, and can program the acceleration engine 1260 to execute the neural network on the set of input data. In some examples, the support systems 1274 only needs to select an appropriate neural network processing engine of the neural network processor. In some examples, the support systems 1274 may need to load the data for the neural network onto the acceleration engine 1260 before the acceleration engine 1260 can start executing the neural network. In these and other examples, the support systems 1274 can further receive the output of executing the neural network, and provide the output back to the host processor 1272.

In some examples, the operations of the support systems 1274 can be handled by the host processor 1272. In these examples, the support systems 1274 may not be needed and can be omitted from the host system 1200.

In various examples, the host system 1200 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1200 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 13:
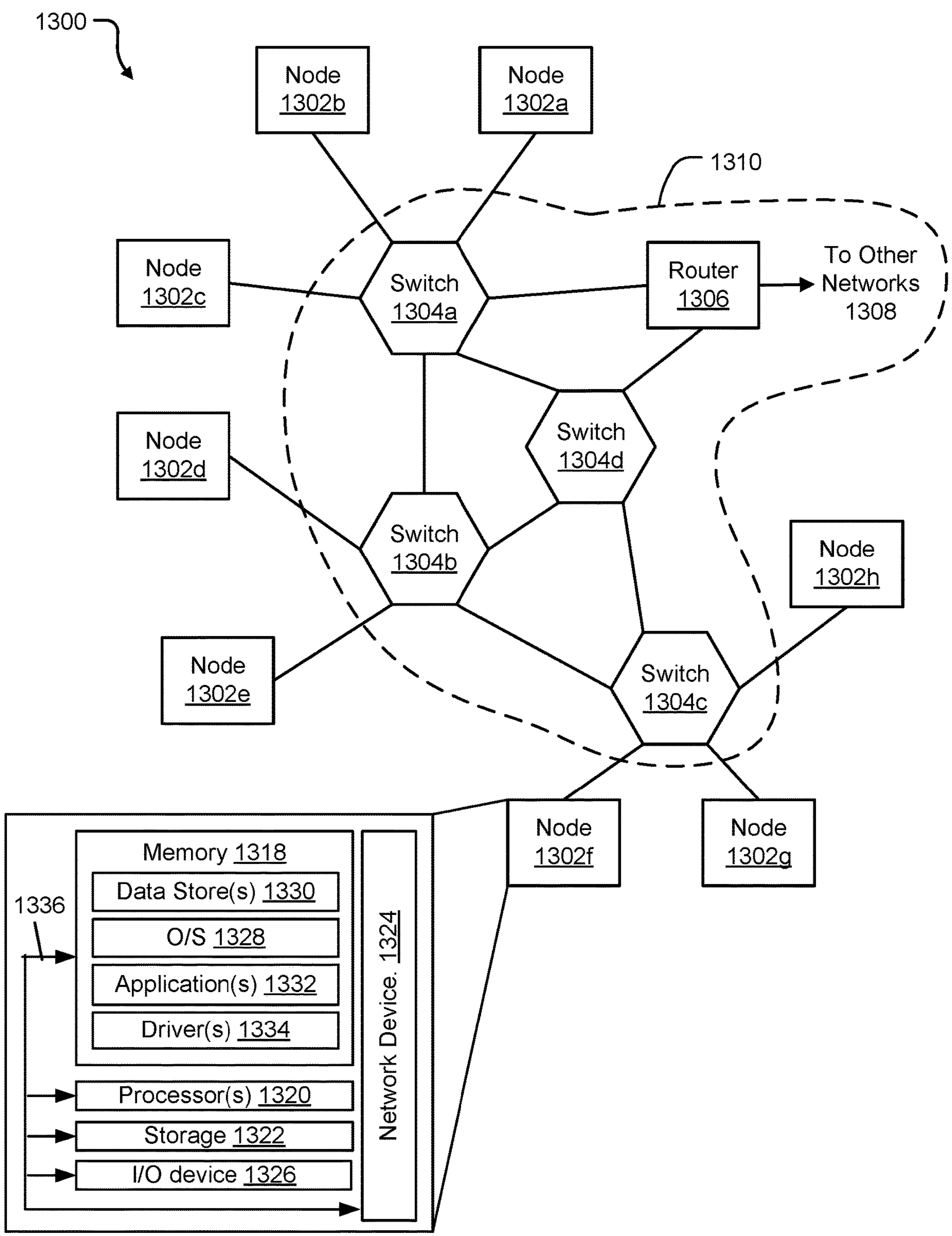
FIG. 13 includes a diagram of an example of a network.

FIG. 13 includes a diagram of an example network 1300, which can include one or more host systems, such as the host system illustrated in FIG. 12. For example, the example network 1300 of FIG. 13 includes multiple nodes **1302*a*-1302*h*, one or more of which can be a host system such as is illustrated in FIG. 12. Others of the nodes 1302*a*-1302*h* can be other computing devices, each of which include at least a memory for storing program instructions, a processor for executing the instructions, and a network interface for connecting to the network 1300**.

In various examples, the network 1300 can be used to process data. For example, input data can be received at one of the nodes **1302*a*-1302*h* or from other networks 1308 with which the network 1300 can communicate. In this example, the input data can be directed to a node in the network 1300 that includes an acceleration engine, for the acceleration engine to operate on and produce a result. The result can then be transferred to the node or other network from which the input data was received. In various examples, input data can be accumulated from various sources, including one or more of the nodes 1302*a*-1302*h* and/or computing devices located in the other networks 1308, and the accumulated input data can be directed to one or more host systems in the network 1300**. Results from the host systems can then be distributed back to the sources from which the input data was gathered.

In various examples, one or more of the nodes **1302*a*-1302*h*** can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 13, the nodes **1302*a*-1302*h* are connected to one another using a switched architecture with point-to point links. The switched architecture includes multiple switches 1304*a*-1304*d*, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1304*a*-1304*d* of FIG. 13 may be connected to the nodes 1302*a*-1302*h*** and provide multiple paths between any two nodes.

The network 1300 may also include one or more network devices for connection with other networks 1308, such as a router 1306. Routers use headers and forwarding tables to determine the best path for forwarding the packets, and use protocols such as internet control message protocol (ICMP) to communicate with each other and configure the best route between any two devices. The router 1306 of FIG. 13 can be used to connect to other networks 1308 such as subnets, LANs, wide area networks (WANs), and/or the Internet.

In some examples, network 1300 may include any one or a combination of many different types of networks, such as cable networks, the Internet, wireless networks, cellular networks and other private and/or public networks. The interconnected switches **1304*a*-1304*d* and the router 1306, if present, may be referred to as a switch fabric 1310**, a fabric, a network fabric, or simply a network. In the context of a computer network, terms "fabric" and "network" may be used interchangeably herein.

The nodes **1302*a*-1302*h*** may be any combination of host systems, processor nodes, storage subsystems, and I/O chassis that represent user devices, service provider computers or third party computers.

User devices may include computing devices to access an application 1332 (e.g., a web browser or mobile device application). In some aspects, the application 1332 may be hosted, managed, and/or provided by a computing resources service or service provider. The application 1332 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1308. Additionally, the user device(s) may be part of the distributed system managed by, controlled by, or otherwise part of the service provider computer(s) (e.g., a console device integrated with the service provider computers).

The node(s) of FIG. 13 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1332 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1302*a*-1302*h* may include at least one memory 1318 and one or more processing units (or processor(s) 1320). The processor(s) 1320 may be implemented in hardware, computer-executable instructions, firmware, or combinations thereof. Computer-executable instruction or firmware implementations of the processor(s) 1320 may include computer-executable or machine-executable instructions written in any suitable programming language to perform the various functions described.

In some instances, the hardware processor(s) 1320 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1318 may store program instructions that are loadable and executable on the processor(s) 1320, as well as data generated during the execution of these programs. Depending on the configuration and type of the node(s) 1302*a*-1302*h*, the memory 1318 may be volatile (such as RAM) and/or non-volatile (such as ROM, flash memory, etc.). The memory 1318 may include an operating system 1328, one or more data stores 1330, one or more application programs 1332, one or more drivers 1334, and/or services for implementing the features disclosed herein.

The operating system 1328 may support nodes 1302*a*-1302*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1328 may also be a proprietary operating system.

The data stores 1330 may include permanent or transitory data used and/or operated on by the operating system 1328, application programs 1332, or drivers 1334. Examples of such data include web pages, video data, audio data, images, user data, and so on. The information in the data stores 1330 may, in some implementations, be provided over the network(s) 1308 to user devices. In some cases, the data stores 1330 may additionally or alternatively include stored application programs and/or drivers. Alternatively or additionally, the data stores 1330 may store standard and/or proprietary software libraries, and/or standard and/or proprietary application user interface (API) libraries. Information stored in the data stores 1330 may be machine-readable object code, source code, interpreted code, or intermediate code.

The drivers 1334 include programs that may provide communication between components in a node. For example, some drivers 1334 may provide communication between the operating system 1328 and additional storage 1322, network device 1324, and/or I/O device 1326. Alternatively or additionally, some drivers 1334 may provide communication between application programs 1332 and the operating system 1328, and/or application programs 1332 and peripheral devices accessible to the service provider computer. In many cases, the drivers 1334 may include drivers that provide well-understood functionality (e.g., printer drivers, display drivers, hard disk drivers, Solid State Device drivers). In other cases, the drivers 1334 may provide proprietary or specialized functionality.

The service provider computer(s) or servers may also include additional storage 1322, which may include removable storage and/or non-removable storage. The additional storage 1322 may include magnetic storage, optical disks, solid state disks, flash memory, and/or tape storage. The additional storage 1322 may be housed in the same chassis as the node(s) 1302*a*-1302*h* or may be in an external enclosure. The memory 1318 and/or additional storage 1322 and their associated computer-readable media may provide non-volatile storage of computer-readable instructions, data structures, program modules, and other data for the computing devices. In some implementations, the memory 1318 may include multiple different types of memory, such as SRAM, DRAM, or ROM.

The memory 1318 and the additional storage 1322, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1318 and the additional storage 1322 are examples of computer storage media. Additional types of computer storage media that may be present in the node(s) 1302*a*-1302*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1302*a*-1302*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1302*a*-1302*h* may also include I/O device(s) 1326, such as a keyboard, a mouse, a pen, a voice input device, a touch input device, a display, speakers, a printer, and the like. The node(s) 1302*a*-1302*h* may also include one or more communication channels 1336. A communication channel 1336 may provide a medium over which the various components of the node(s) 1302*a*-1302*h* can communicate. The communication channel or channels 1336 may take the form of a bus, a ring, a switching fabric, or a network.

The node(s) 1302*a*-1302*h* may also contain network device(s) 1324 that allow the node(s) 1302*a*-1302*h* to communicate with a stored database, another computing device or server, user terminals and/or other devices on the network(s) 1300.

In some implementations, the network device 1324 is a peripheral device, such as a PCI-based device. In these implementations, the network device 1324 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1324 may be connected to a computing system using a PCIe interface.

A PCI-based device may include one or more functions. A "function" describes operations that may be provided by the network device 1324. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1324 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:

generating, based on a neural network model and a configuration of a computing system, instruction code for execution by the computing system to implement the neural network model, the instruction code including a plurality of direct memory access (DMA) instructions for transferring data between a state buffer of an accelerator of the computing system and a dynamic random access memory (DRAM) device of the computing system;

identifying, from the instruction code, a first instruction for allocating a first region of the state buffer to a tensor, and a first DMA load instruction for loading the tensor from a location of the DRAM to a second region of the state buffer;

selecting a third region of the state buffer that is not used in a time period after a last use of the tensor in the first region of the state buffer and before a start of the first DMA load instruction and has a size equal to or greater than a size of the tensor, wherein the tensor has a dimension greater than a corresponding dimension of the third region of the state buffer;

replacing, in the instruction code, a DMA save instruction for saving the tensor in the first region of the state buffer to the location of the DRAM with a first tensor copy instruction that reads the tensor from the first region of the state buffer, reshapes the tensor based on dimensions of the third region of the state buffer, and saves the reshaped tensor to the third region of the state buffer;

adding, at or before the first DMA load instruction in the instruction code, a second tensor copy instruction that reads the reshaped tensor from the third region of the state buffer, changes the reshaped tensor into a tensor having dimensions of the second region of the state buffer, and saves the tensor having the dimensions of the second region of the state buffer to the second region of the state buffer; and removing the first DMA load instruction from the instruction code.

2. The computer-implemented method of claim 1, wherein the first tensor copy instruction and the second tensor copy instruction are scheduled to be performed by a pooling engine of the accelerator, the pooling engine connected to the state buffer through a dedicated bus interface.

3. The computer-implemented method of claim 2, wherein the state buffer and the pooling engine are on a same semiconductor chip or in a same integrated circuit package.

4. The computer-implemented method of claim 1, further comprising:

determining, from the instruction code, a second DMA load instruction for loading the tensor from the location of DRAM to the state buffer, the second DMA load instruction being between the first instruction and the first DMA load instruction; and changing the second DMA load instruction in the instruction code to a third tensor copy instruction for reading the reshaped tensor from the third region of the state buffer, changing the reshaped tensor into a tensor having dimensions of a destination of the second DMA load instruction, and writing the tensor having the dimensions of the destination of the second DMA load instruction to the destination of the second DMA load instruction.

5. A computer-implemented method comprising:

identifying, from instruction code for execution by a computing system to implement a neural network model, a first instruction for allocating a first region of a local memory of an accelerator of the computing system to a data block; and a first direct memory access (DMA) load instruction for loading the data block from a location of a system memory of the computing system to the local memory of the accelerator of the computing system;

selecting a local memory block that has a size equal to or greater than a size of the data block and is not used in a time period after the first instruction and before the first DMA load instruction;

adding, to the instruction code, a first tensor copy instruction for saving the data block in the first region of the local memory to the selected local memory block at a time after the first instruction and before the first DMA load instruction; and replacing the first DMA load instruction in the instruction code with a second tensor copy instruction for saving data in the selected local memory block to a destination of the first DMA load instruction.

6. The computer-implemented method of claim 5, wherein the data block in the first region of the local memory has more partitions than the selected local memory block, or has more bytes in each partition than the selected local memory block.

7. The computer-implemented method of claim 5, wherein the first tensor copy instruction and the second tensor copy instruction maintain a total size of the data block but change dimensions of the data block.

8. The computer-implemented method of claim 5, wherein the first tensor copy instruction and the second tensor copy instruction are scheduled to be performed by a processing engine of the accelerator, the processing engine connected to the local memory of the accelerator through a dedicated bus interface.

9. The computer-implemented method of claim 8, wherein the processing engine includes a pooling engine.

10. The computer-implemented method of claim 8, wherein the dedicated bus interface is configured to parallelly read from or write to a plurality of partitions of the local memory.

11. The computer-implemented method of claim 8, wherein the processing engine and the local memory are on a same semiconductor chip or in a same integrated circuit package.

12. The computer-implemented method of claim 5, further comprising:

determining, from the instruction code, a second DMA load instruction for loading the data block from the location of the system memory to the local memory, the second DMA load instruction before or after the first DMA load instruction; and replacing the second DMA load instruction in the instruction code with a third tensor copy instruction for writing the data in the selected local memory block to a destination of the second DMA load instruction.

13. The computer-implemented method of claim 5, wherein the first instruction includes:

a tensor operation instruction for generating the data block; or a second DMA load instruction for loading the data block from the location of the system memory to the first region of the local memory.

14. The computer-implemented method of claim 5, further comprising:

identifying, from the instruction code, a DMA save instruction for saving the data block from the local memory to the location of the system memory, the DMA save instruction being after the first instruction, wherein adding the first tensor copy instruction includes replacing the DMA save instruction with the first tensor copy instruction.

15. The computer-implemented method of claim 5, wherein selecting the local memory block includes:

identifying a plurality of regions of the local memory that each have a size equal to or greater than the size of the data block and are not used in the time period after the first instruction and before the first DMA load instruction; and selecting a region that has the smallest size among the plurality of regions of the local memory as the local memory block for saving the data block in the first region of the local memory.

16. A non-transitory computer readable medium having stored therein instructions that, when executed by one or more processors, cause the one or more processors to execute a compiler, the compiler performing operations including:

identifying, from instruction code for execution by a computing system to implement a neural network model, a first instruction for allocating a first region of a local memory of an accelerator of the computing system to a data block; and a first direct memory access (DMA) load instruction for loading the data block from a location of a system memory of the computing system to the local memory of the accelerator of the computing system;

selecting a local memory block that has a size equal to or greater than a size of the data block and is not used in a time period after the first instruction and before the first DMA load instruction;

adding, to the instruction code, a first tensor copy instruction for saving the data block in the first region of the local memory to the selected local memory block at a time after the first instruction and before the first DMA load instruction; and replacing the first DMA load instruction in the instruction code with a second tensor copy instruction for saving data in the selected local memory block to a destination of the first DMA load instruction.

17. The non-transitory computer readable medium of claim 16, wherein:

the data block in the first region of the local memory has more partitions than the selected local memory block, or has more bytes in each partition than the selected local memory block; and the first tensor copy instruction and the second tensor copy instruction maintain a total size of the data block but change dimensions of the data block.

18. The non-transitory computer readable medium of claim 16, wherein the first tensor copy instruction and the second tensor copy instruction are scheduled to be performed by a processing engine of the accelerator, the processing engine connected to the local memory of the accelerator through a dedicated bus interface.

19. The non-transitory computer readable medium of claim 16, wherein the operations further comprise:

determining, from the instruction code, a second DMA load instruction for loading the data block from the location of the system memory to the local memory, the second DMA load instruction being before or after the first DMA load instruction; and replacing the second DMA load instruction in the instruction code with a third tensor copy instruction for writing the data in the selected local memory block to a destination of the second DMA load instruction.

20. The non-transitory computer readable medium of claim 16, wherein the operations further comprise:

identifying, from the instruction code, a DMA save instruction for saving the data block from the local memory to the location of the system memory, the DMA save instruction after the first instruction, wherein adding the first tensor copy instruction includes replacing the DMA save instruction with the first tensor copy instruction.

* * * * *